United States Patent
Romanovsky

(10) Patent No.: US 6,768,572 B2
(45) Date of Patent: Jul. 27, 2004

(54) SOLID STATE FREE SPACE SWITCH ARRAY ON A SUBSTRATE

(75) Inventor: Alexander B. Romanovsky, San Jose, CA (US)

(73) Assignee: Teloptics Corporation, San Francisco, CA (US)

( * ) Notice: Subject to any disclaimer, the term of this patent is extended or adjusted under 35 U.S.C. 154(b) by 0 days.

(21) Appl. No.: 10/140,519

(22) Filed: May 7, 2002

(65) Prior Publication Data

US 2002/0135851 A1 Sep. 26, 2002

Related U.S. Application Data

(63) Continuation-in-part of application No. 10/013,336, filed on Nov. 5, 2001, which is a continuation-in-part of application No. 09/434,085, filed on Nov. 5, 1999, now Pat. No. 6,381,060, which is a continuation-in-part of application No. 08/959,778, filed on Oct. 29, 1997, now Pat. No. 6,310,712, said application No. 10/140,519.

(60) Provisional application No. 60/245,810, filed on Nov. 3, 2000, and provisional application No. 60/289,204, filed on May 7, 2001.

(51) Int. Cl.[7] .............................. G02F 1/03; G02F 1/07; G02B 6/35

(52) U.S. Cl. ...................... 359/245; 359/247; 359/320; 385/16

(58) Field of Search ................................ 359/245, 247, 359/248, 261, 315, 316, 318, 320, 641, 256, 250, 259; 385/16–23

(56) References Cited

U.S. PATENT DOCUMENTS

| | | | |
|---|---|---|---|
| 3,458,247 A | 7/1969 | Buhrer et al. ................ | 359/316 |
| 3,497,286 A | 2/1970 | Morton et al. ............... | 359/289 |
| 3,584,223 A | 6/1971 | Aldrich et al. .............. | 250/216 |

(List continued on next page.)

FOREIGN PATENT DOCUMENTS

| | | |
|---|---|---|
| EP | 0 344 857 A1 | 5/1989 |
| GB | 2 304 919 A | 3/1997 |
| JP | 62-85219 | 4/1987 |

(List continued on next page.)

OTHER PUBLICATIONS

*Compact optical cross–connect switch based on total internal reflection in a fluid–containing planar lightwave circuit*, J.E. Fouquet, Optical Fiber Communication Conference, OSA Technical Digest (Optical Society of America, Washington, D.C., 2000), TuM1–1, pp. 204–205.

*Antiferroelectric–Phase PLZT For Use In High Density Optical Data Storage*, S. Mancha, J. Bullington, R. Carter and C. Dehainaut, Airforce Weapons Laboratory (AFSC) Kirtland Airforce Base New Mexico, *Ferroelectrics*, 1988 Gordon and Breach Science Publishers S.A., vol. 82, pp. 99–104.

(List continued on next page.)

*Primary Examiner*—Georgia Epps
*Assistant Examiner*—M. Hasan
(74) *Attorney, Agent, or Firm*—Knobbe, Martens, Olson & Bear, LLP

(57) ABSTRACT

A switching array comprising a plurality of total internal reflection (TIR) switches can be used to direct optical signals from any one of a plurality of input optical fibers to any one of a plurality of output optical fibers. Free space regions exist between the input optical fibers, the switches, and the output optical fibers. Accordingly, the light from an input optical fiber to an output optical fiber travels through the TIR switch array largely, if not entirely, in free space mode. To provide efficient coupling of light from the input optical fibers to the plurality of switches and ultimately to the output optical fibers, collimators and other coupling elements are employed. Preferably, the collimators have a Rayleigh range longer than the path length that the light will travel from the respective input optical fiber to the respective output optical fiber.

38 Claims, 12 Drawing Sheets

U.S. PATENT DOCUMENTS

| | | | |
|---|---|---|---|
| 3,873,187 A | 3/1975 | Brooks | 359/259 |
| 3,958,862 A | 5/1976 | Scibor-Rylski | 359/261 |
| 4,006,963 A | 2/1977 | Baues et al. | 385/37 |
| 4,008,947 A | 2/1977 | Baües et al. | 385/9 |
| 4,125,318 A | 11/1978 | Scibor-Rylski | 359/317 |
| 4,181,399 A | 1/1980 | McMahon et al. | 385/16 |
| 4,196,977 A | 4/1980 | Scibor-Rylski et al. | 359/279 |
| 4,201,442 A | 5/1980 | McMahon et al. | 385/17 |
| 4,278,327 A | 7/1981 | McMahon et al. | 349/197 |
| 4,281,904 A | 8/1981 | Sprague et al. | 359/263 |
| 4,283,113 A | 8/1981 | Eden | 385/18 |
| 4,285,569 A | 8/1981 | Yao et al. | 385/10 |
| 4,367,946 A | 1/1983 | Varner | 355/71 |
| 4,385,799 A | 5/1983 | Soref | 385/17 |
| 4,396,252 A | 8/1983 | Turner | 359/263 |
| 4,406,521 A | 9/1983 | Mir et al. | 359/254 |
| 4,410,823 A | 10/1983 | Miller et al. | 310/313 D |
| 4,451,123 A | 5/1984 | McNeill et al. | 359/263 |
| 4,478,483 A | 10/1984 | Sprague | 385/40 |
| 4,491,384 A | 1/1985 | Yamashita et al. | 385/7 |
| 4,514,739 A | 4/1985 | Johnson et al. | 347/248 |
| 4,560,994 A | 12/1985 | Sprague | 347/239 |
| 4,563,059 A | 1/1986 | Clark et al. | 349/123 |
| 4,585,301 A | 4/1986 | Bialkowski | 359/243 |
| 4,645,293 A | 2/1987 | Yoshida et al. | 385/40 |
| 4,669,831 A | 6/1987 | Birnbaum et al. | 359/318 |
| 4,693,547 A | 9/1987 | Soref et al. | 385/16 |
| 4,697,889 A | 10/1987 | Takubo et al. | 359/254 |
| 4,728,167 A | 3/1988 | Soref et al. | 385/16 |
| 4,739,520 A | 4/1988 | Collins, Jr. et al. | 398/45 |
| 4,746,191 A | 5/1988 | Kawakami et al. | 385/16 |
| 4,746,942 A | 5/1988 | Moulin | 396/549 |
| 4,765,721 A | 8/1988 | Agostinelli | 359/251 |
| 4,766,445 A | 8/1988 | Springer | 347/238 |
| 4,796,982 A | 1/1989 | Kitabatake et al. | 359/318 |
| 4,798,435 A | 1/1989 | Fujiwara et al. | 385/17 |
| 4,802,741 A | 2/1989 | Kaukeinen | 359/254 |
| 4,813,771 A | 3/1989 | Handschy et al. | 349/196 |
| 4,815,803 A | 3/1989 | Faulkner et al. | 385/24 |
| 4,822,124 A | 4/1989 | Suzuki | 385/17 |
| 4,842,368 A | 6/1989 | Darcie et al. | 385/30 |
| 4,865,406 A | 9/1989 | Khanarian et al. | 385/122 |
| 4,867,516 A | 9/1989 | Baken | 385/3 |
| 4,867,543 A | 9/1989 | Bennion et al. | 359/259 |
| 4,887,104 A | 12/1989 | Kitano et al. | 359/246 |
| 4,896,930 A | 1/1990 | Tsuchitani et al. | 385/122 |
| 4,919,522 A | 4/1990 | Nelson | 359/246 |
| 4,952,010 A | 8/1990 | Healey et al. | 359/11 |
| 4,973,121 A | 11/1990 | Brophy et al. | 385/10 |
| 4,988,157 A | 1/1991 | Jackel et al. | 385/17 |
| 4,993,811 A | 2/1991 | Blazey et al. | 359/251 |
| 5,006,285 A | 4/1991 | Thackara et al. | 264/1.27 |
| 5,011,271 A | 4/1991 | Saito et al. | 359/259 |
| 5,016,959 A | 5/1991 | Diemeer | 385/16 |
| 5,031,978 A | 7/1991 | Shibaguchi et al. | 359/206 |
| 5,033,814 A | 7/1991 | Brown et al. | 385/16 |
| 5,036,220 A | 7/1991 | Byer et al. | 359/328 |
| 5,040,864 A | 8/1991 | Hong | 385/16 |
| 5,061,028 A | 10/1991 | Khanarian et al. | 385/132 |
| 5,078,478 A | 1/1992 | Evans | 359/299 |
| 5,090,824 A | 2/1992 | Nelson et al. | 385/22 |
| 5,103,492 A | 4/1992 | Ticknor | 385/9 |
| 5,153,770 A | 10/1992 | Harris | 359/245 |
| 5,157,541 A | 10/1992 | Schildkraut et al. | 359/276 |
| 5,168,535 A | 12/1992 | Laor | 385/16 |
| 5,182,665 A | 1/1993 | O'Callaghan et al. | 349/201 |
| 5,189,548 A | 2/1993 | Hecht | 359/263 |
| 5,220,643 A | 6/1993 | Collings | 706/40 |
| 5,221,989 A | 6/1993 | Stappaerts et al. | 359/323 |
| 5,255,332 A | 10/1993 | Welch et al. | 385/17 |
| 5,260,719 A | 11/1993 | Maloney | 347/135 |
| 5,267,336 A | 11/1993 | Sriram et al. | 385/2 |
| 5,274,246 A | 12/1993 | Hopkins et al. | 257/17 |
| 5,278,924 A | 1/1994 | Schaffner | 385/3 |
| 5,305,136 A | 4/1994 | Smith | 359/247 |
| 5,337,183 A | 8/1994 | Rosenblatt | 359/248 |
| 5,347,377 A | 9/1994 | Revelli, Jr. et al. | 349/193 |
| 5,349,466 A | 9/1994 | Delacourt et al. | 359/326 |
| 5,367,584 A | 11/1994 | Ghezzo et al. | 385/17 |
| 5,367,585 A | 11/1994 | Ghezzo et al. | 385/23 |
| 5,369,718 A | 11/1994 | Kamata et al. | 385/21 |
| 5,396,363 A | 3/1995 | Valette | 359/248 |
| 5,412,743 A | 5/1995 | Brazas, Jr. | 385/2 |
| 5,416,631 A | 5/1995 | Yagi | 359/254 |
| 5,455,709 A | 10/1995 | Dula, III et al. | 359/245 |
| 5,504,772 A | 4/1996 | Deacon et al. | 372/102 |
| 5,521,748 A | 5/1996 | Sarraf | 359/321 |
| 5,528,414 A | 6/1996 | Oakley | 359/257 |
| 5,559,906 A | 9/1996 | Maerz | 385/3 |
| 5,581,643 A | 12/1996 | Wu | 385/17 |
| 5,615,041 A | 3/1997 | Field et al. | 359/326 |
| 5,631,735 A | 5/1997 | Nagai | 356/330 |
| 5,699,462 A * | 12/1997 | Fouquet et al. | 385/18 |
| 5,732,177 A | 3/1998 | Deacon et al. | 385/122 |
| 5,835,458 A | 11/1998 | Bischel et al. | 369/44.12 |
| 5,862,276 A | 1/1999 | Karras | 385/30 |
| 5,909,303 A | 6/1999 | Trezza | 359/248 |
| 5,966,234 A | 10/1999 | Ford et al. | 359/248 |
| 5,966,493 A | 10/1999 | Wagoner et al. | 385/140 |
| 5,978,125 A | 11/1999 | Yao | 359/256 |
| 6,049,640 A | 4/2000 | Doerr | 385/15 |
| 6,055,087 A | 4/2000 | Kwon et al. | 359/248 |
| 6,055,344 A | 4/2000 | Fouquet et al. | 385/16 |
| 6,057,955 A | 5/2000 | Yamamoto | 359/254 |
| 6,111,633 A | 8/2000 | Albert et al. | 349/196 |
| 6,124,965 A | 9/2000 | Doi et al. | 359/248 |
| 6,229,934 B1 * | 5/2001 | Melman et al. | 385/18 |
| 6,288,822 B2 | 9/2001 | Romanovsky | 359/245 |
| 6,297,899 B1 | 10/2001 | Romanovsky | 359/245 |
| 6,310,712 B1 | 10/2001 | Romanovsky | 359/245 |
| 6,320,994 B1 * | 11/2001 | Donald et al. | 385/16 |
| 6,381,060 B1 | 4/2002 | Romanovsky | 359/245 |
| 6,486,996 B1 | 11/2002 | Romanovsky | 359/245 |
| 6,614,574 B2 | 9/2003 | Romanovsky | 359/247 |
| 2002/0136482 A1 * | 9/2002 | Zhang | 385/16 |

FOREIGN PATENT DOCUMENTS

| | | |
|---|---|---|
| JP | 62-267719 | 11/1987 |
| JP | 05-005922 | 1/1993 |
| JP | 06-350050 | 12/1994 |
| JP | 07-020499 | 1/1995 |
| WO | WO 90/14606 | 11/1990 |
| WO | WO 95/33219 | 12/1995 |
| WO | WO 95/34016 | 12/1995 |
| WO | WO 96/07940 | 3/1996 |
| WO | WO 96/07943 | 3/1996 |
| WO | WO 96/07945 | 3/1996 |
| WO | WO 96/07949 | 3/1996 |
| WO | WO 96/07950 | 3/1996 |
| WO | WO 96/07952 A1 | 3/1996 |
| WO | WO 96/08059 | 3/1996 |
| WO | WO 96/10776 | 4/1996 |
| WO | WO 96/18131 | 6/1996 |
| WO | WO 96/41216 | 12/1996 |
| WO | WO 97/16763 | 5/1997 |
| WO | WO 98/07279 | 2/1998 |
| WO | WO 98/10321 | 3/1998 |
| WO | WO 98/35251 | 8/1998 |
| WO | WO 98/40770 | 9/1998 |
| WO | WO 98/40771 | 9/1998 |
| WO | WO 98/40783 | 9/1998 |

| | | |
|---|---|---|
| WO | WO 98/59276 | 12/1998 |
| WO | WO 99/12061 | 3/1999 |
| WO | WO 99/19763 | 4/1999 |
| WO | WO 99/22266 | 5/1999 |

OTHER PUBLICATIONS

*Crossing–Channel Waveguide Electroptic Modulators,* Gary E. Betts and William S.C. Chang, IEEE Journal of Quantum Electronics, vol. QE–22, No. 7, Jul. 1986, pp. 1027–1038.

*Crystallization of Lanthanum–Modified Lead Zirconate Titanate (PLZT) Using Coprecipitated Gels,* Yao–Jung Lee, Fu–Su Yen, Jong–Ping Wu and Hsing–I Hsiang, Jpn. J. Appl. Phys. vol. 34, Pt. 1, No. 8A, Aug. 1995, pp. 4137–4142.

*Deposition and Characterization of Thin Ferroelectric Lead Lanthanum Zirconate Titanate (PLZT) Films on Sapphire For Spatial Light Modulators Applications,* S. Krishnakumar, V.H. Ozguz, C. Fan, C. Cozzolino, S.C. Esener and S.H. Lee, IEEE Transactions on ultrasonics, Ferroelectrics and Frequency Control, vol. 38, No. 6, Nov. 1991, pp. 585–590.

*Electrooptic Light Modulators,* I.P. Kaminow and E.H. Turner, Proceedings of the IEEE, vol. 54, No. 10, Oct. 1966, pp. 1374–1390.

*Electrooptical Channel Waveguide Matrix Switch Using Total Internal Reflection,* F.R. El–Akkari, C.L. Chang and C.S. Tsai, Topical Meeting on Integrated and Guided Wave Optics, Incline Village, Nev., Paper TuE4, 1980.

*Electrooptics, Phenomena, Materials and Applications,* Fernando Agulló–López, José Manuel Cabrera, Fernando Agulló–Rueda, Academic Press, Harcourt Brace & Company Publishers, 1994, pp. 193–197.

*High Speed Optical TIR Switches Using PLZT Thin–Film Waveguides on Sapphire,* Hidetaka Higashino, Takao Kawaguchi, Hideaki Adachi, Toshihiko Makino and Osamu Yamazaki, Proceedings of the Sixth International meeting on Ferroelectricity, Kobe, 1985, Jpn. J. Appl. Phys. vol. 24 (1985) Suppl 24–2, p. 284.

*One–Dimensional Silicon/PLZT Spatial Light Modulators,* Sadik C. Esener, Jing H. Wang, Timothy J. Drabik, Mark A. Title and Sing H. Lee, Optical Engineering, May 1987, vol. 26, No. 5, pp. 406–413.

*PLZT Laser Beam Modulator,* Maris Ozolinsh, Paulis Paulins, Ansis Viesturs, Maris Kundzins, Karlis Kundzins, Andris Krumins, Ferroelectrics, 1992, vol. 128, pp. 73–78.

*Preparation of Pb(Zr,Ti)O$_3$ Thin Films by Sol–Gel Technique,* Tomoyasu Takusagawa, Noriaki Yamada, Terumasa Kato, Hajime Hattori and Teruyuki Matsui, Jpn. J. Appl. Phys. vol. 33, Pt. 1, No. 9B, 1994, pp. 5151–5154.

Utsunomiya et al., Japanese Journal of Applied Physics, vol. 24, Supplement 24–3 May, 1985, pp. 169–171.

P. Shames et al, *Modeling and optimization of electro–optic phase modulator,* Article on Web at http://kfir.ucsd.edu/papers/Modeling.pdf.

8×8 Optical Waveguide Switch Using Liquid Crystal, Hiroshi Terui and Morio Kobayashi, Integrated Optical Circuit Engineering, SPIE, vol. 517,1984, pp. 267–274.

A Low–Crosstalk Microoptic Liquid Crystal Switch, Skinner & Lane, IEEE Journal on Selected Areas in Communications, 6(7):1178–1185 (1988).

A Very low Operation Current InGaAsP/InP Total Internal Reflection Optical Switch using p/n/p/n Current Blocking Layers, Kwang–Ryong Oh, Ki–Sung Park, Dae–Kon Oh, Hong–Man Kim, Hyung Moo Park and KwyRo Lee, IEEE Photonics Technology Letter, vol. 6 No. 1, Jan. 1994, pp. 65–67.

Digital Optical Switch, Y Silberberg, P. Perlmutter and J.E. Baran, Appl. Phys. Lett., vol. 51 No. 16, Oct. 19, 1987, pp. 1230–1232.

Electro–Optic Switching Using Total Internal Reflection by a Ferroelectric Liquid Crystal, Meadows et al., Appl. Phys. Lett., 54(15):1394–1396 (1989).

Linear total internal reflection spatial light modulator for laser printing, Robert A. Sprague, William D. Turner, Lawrence N. Flores, SPIE vol. 299 Advances in Laser Scanning Technology (1981), pp. 68–75.

Liquid Crystal Switching Components, Richard A. Soref, Proceedings: Fiber Optic Communications (1980).

Optical Switch Utilizing Total Reflection of (Pb, La) (Zr, Ti)O$_3$ Ceramics, Toshio Utsunomiya, Jpn J. Appl. Phys. vol. 33 (1994) pp. 5440–5442 Part 1, No. 9B, Sep. 1994.

Total Reflection Liquid–Crystal Electrooptic Device, R.A. Kashnow and C.R. Stein, Applied Optics, vol. 12, No. 10, Oct. 1973, pp. 2309–2311.

Total Switching of Unpolarized Fiber With a Four–Port Electro–Optic Liquid–Crystal Device, R.A. Soref and D.H. McMahon, Optical Society of America, 5(4):147–149 (1980).

*Optical TIR Switches Using PLZT Thin–Film Waveguides on Sapphire,* Kiyota Wasa et al., Journal of Lightwave Technology, vol. LT–2, No. 5, pp. 710–713, Oct. 1984.

*Integrated Optical Devices Based on Nonlinear Optical Polymers,* Emmanuel Van Tomme et al., IEEE Journal of Quantum Electronics, vol. 27, No. 3. Mar. 1991, pp. 778–787.

*Electro–Optic Functional Waveguide Using New Polymer p–NAn–PVA for Integrated Photonic Devices,* Shogo Ura et al., Jpn. J. Appl. Phys., vol. 31, (1992) pp. 1378–1381.

*Mirror–type optical branch and switch,* H. Naitoh et al., Applied Optics, vol. 17, No. 1, Jan. 1978, pp. 101–104.

*Electrically active optical bifurcation:* BOA, M. Papuchon et al., *Applied Physics Letters,* vol. 31, No. 4, Aug. 15, 1977, pp. 226–267.

*Theoritical and Experimental Studies on Active Y–Junctions in Optical Waveguides,* Hiroshi Sasaki et al., *IEEE Journal of Quantum Electronics,* vol. QE–14, No. 11, Nov. 1978, pp. 883–892.

*Integrated Optics Components and Devices Using Periodic Structures,* Toshiaki Suhara et al., *IEEE Journal of Quantum Electronics,* vol. QE–22, No. 6, Jun. 1986, pp. 845–867.

CLEO'93/Tuesday Afternoon, CTuN63, *thin–film electro–optic beam deflector using domain reversal in LiTaO$_3$,* Qibiao Chen et al, pp. 196–197.

*Poled electro–optic waveguide formation in thin–film organic media,* J.I. Thackara et al., *Appl. Phys. Lett.* 52(13), Mar. 28, 1988, pp. 1031–1033.

*Electrooptical switching in thin film waveguides for a computer communication bus,* R. A. Becker et al., *Applied Optics,* vol. 18, No. 19, Oct. 1, 1979, pp. 3296–3300.

*Prism–Type Optical Deflector Using PLZT Ceramics,* Toshio Utsunomiya et al., *Japanese Journal of Applied Physics,* vol. 24, (1985) Supplement 24–3, pp. 169–171.

Nishihara et al., *Optical Integrated Circuits,* McGraw–Hill Book Company, Copyright 1985, 1989, pp. 294–296, 305–341.

*Bulk vs. Thin Film PLZT Ferroelectrics,* Dausch, et al., Department of Ceramic Engineering, Clemson University, IEEE, pp. 297–300.

*Comparison of electro–optic lead–lanthanum zirconate titanate films on crystalline and glass substrates,* Appl. Phys. Lett., vol. 60, No. 23, Jun. 8, 1992, pp. 2831–2833.

*Transverse electro–optic effedt of antiferroelectric lead zirconate thin films,* Wang et al., Optical Society of America, 1992, pp. 1122–1124.

Patent Abstracts of Japan, Publication No. 56–101123, Publication Date: Aug. 13, 1981.

Patent Abstracts of Japan, Publication No. 60–097319, Publication Date: May 31, 1985.

Patent Abstracts of Japan, Publication No. 05–281583, Publication Date: Oct. 29, 1993.

Patent Abstracts of Japan, Publication No. 02–002531, Publication Date: Jan. 8, 1990.

U.S. patent application No. 10/013,336, filed on Nov. 5, 2001 (TOPTICS.004CP2).

U.S. patent application No. 10/033,153, filed on Oct. 25, 2001 (TOPTICS.004C3).

U.S. patent application No. 10/247,720, filed on Sep. 19, 2002 (TOPTICS.4C3C1).

U.S. patent application No. 10/648,821, filed on Aug. 26, 2003 (TOPTICS.4CP1C1C).

U.S. patent application No. 10/129,722, filed on Feb. 11, 2003 (TOPTICS.004CP3).

U.S. patent application No. 10/140,083, filed on May 6, 2002 (TOPTICS.004CP4).

U.S. patent application No. 10/138,009, filed on May 2, 2002 (TOPTICS.015A).

U.S. patent application No. 09/891,689, filed on Jun. 26, 2001 (TOPTICS.018A).

U.S. patent application No. 10/140,520, filed on May 7, 2002 (TOPTICS.019A).

U.S. patent application No. 10/151,776, filed on May 20, 2002 (TOPTICS.020A).

U.S. patent application No. 10/156,241, filed on May 24, 2002 (TOPTICS.022A).

\* cited by examiner

SOLID STATE FREE SPACE SWITCH ARRAY ON A SUBSTRATE

PRIORITY APPLICATION

This application is a continuation-in-part of U.S. patent application Ser. No. 10/013,336, entitled "Electro-Optic Switching Assembly and Method" filed on Nov. 5, 2001, which claims the benefit under 35 U.S.C. 119(e) of U.S. Provisional Application No. 60/245,810, filed Nov. 3, 2000, and which is a continuation-in-part of U.S. patent application Ser. No. 09/434,085, filed on Nov. 5, 1999, now U.S. Pat. No. 6,381,060, issued to Romanovsky on Apr. 30, 2002, which is a continuation-in-part of U.S. patent application Ser. No. 08/959,778, filed Oct. 29, 1997, now U.S. Pat. No. 6,310,712, issued to Romanovsky on Oct. 30, 2001. This application also claims priority under 35 U.S.C. §119(e) from U.S. Provisional Patent Application Serial No. 60/289,204, filed May 7, 2001.

BACKGROUND OF THE INVENTION

1. Field of the Invention

This invention relates generally to optical communication technology and, in particular, to an array of free space optical switches comprising electro-optic material that rely on total internal reflection to switch an optical beam.

2. Description of the Related Art

Demands for transmitting signals optically is growing at a rapid pace. Optically transmitted signals are typically in digital format, and may be carried through some form of a waveguide such as an optical fiber.

A network such as a telecommunication network, whether optical or not, typically requires a system of switches to be able to route the signals to proper destinations. As use herein, switching refers to directing the signal from one path to another path as desired. One method of switching optical signals is to first convert a plurality of optical signals into a plurality of electrical signals using an array of photosensitive detectors such as PIN-diodes. The switching can be performed on these resulting electrical signals, and the outgoing electrical signals can be converted back to optical signals using an array of devices such as laser diodes. Such a method requires a substantial infrastructure to provide proper optical-electrical and electrical-optical conversions.

One method of switching optical signals utilizes a total internal reflection (TIR) switch comprising two portions, at least one of which comprises electro-optic material whose refractive index can be altered by application of an electric field. The two portions are positioned adjacent to each other so as to define a boundary between them. By altering the refractive index of at least one of the portions, a sharp gradient in the refractive index can be formed at the boundary. Light input into the switch and incident on the boundary at an appropriate angle can be total internally reflected down one path. In a separate mode, the electric field has a value such that TIR does not occur, and the light input into the switch is substantially transmitted through the boundary and proceeds along another path.

Discussions of TIR switches in prior art, show the TIR switches in conjunction with waveguides formed on a substrate such as lithium niobate. Waveguides are used to interconnect TIR switches in optical switching arrays. See, e.g., U.S. Pat. No. 5,732,177 issued to Deacon et al. However, formation of the waveguides on the substrate, while well known in the art, requires numerous processing steps using expensive equipment. Fabrication of waveguides, thus, adds a level of complexity, and requires specialized production equipment.

Hence, a method of fabricating a TIR switch array in a more simple and economical manner is needed.

SUMMARY OF THE INVENTION

In one aspect of the invention, a switch array comprises a substrate having a surface, a plurality of TIR switches, and at least one input collimator. Each of these switches has a TIR surface and is mounted such that the TIR surface extends substantially orthogonal to the surface of the substrate. The at least one input collimator is mounted to receive an input beam from an optical fiber and transmit a collimated input beam towards at least one of the TIR surfaces. The switch array may further comprise at least one coupling element positioned to receive the collimated input beam and couple it to an optical fiber as an output beam. The array further comprises a free space region between adjacent TIR switches. The free space region comprises material that is substantially optically transmissive to the collimated input beam. This free space region is also substantially devoid of boundaries that limit the beam size of the collimated input beam traveling between the switches so as to provide for free space propagation of the collimated input beam. By having free-space regions and not waveguides interconnecting the switches, fabrication of the switch array can be simplified.

The free space region is preferably dimensioned to substantially exceed the beam size. The collimated input beam has a maximum beam diameter between about 30 μm and 300 μm, and the free space region is dimensioned to exceed this beam diameter.

The free space region may comprise an open region, or alternatively, the free region may comprises a solid material. The substantially optically transmissive solid material in free space region may be selected from the group consisting of glass, quartz, silicon dioxide, sapphire, brookite and rutile. In one embodiment, the substrate comprises a material selected from the group consisting of glass, quartz, silicon, sapphire, brookite and rutile. In one embodiment, the switches are imbedded in the substrate such that the free space region comprises the substrate material.

The switch array may further comprise a free space region between the input collimator and at least one of the TIR switches. This free space region is substantially devoid of boundaries that limit the beam size of the collimated input beam travelling to the TIR switches so as to provide for free space propagation of the collimated input beam. The free space region between the collimator and the TIR switches is dimensioned to substantially exceed the beam size of the collimated input beam, and in one embodiment, the dimension exceeds 30 μm.

The switch array may further comprise a free space region between at least one of the switches and at least one of the optical coupling elements. This free space region is also substantially devoid of boundaries that limit the collimated input beam travelling between the switch and the optical coupling element so as to provide for free space propagation of the collimated input beam. The collimated input beam passing through the free space region between the switch and the optical coupling element has a maximum beam size and the free space region is dimensioned to substantially exceed the beam size.

The TIR switches preferably include a portion comprising electro-optic material sandwiched between two electrodes. The electo-optic portion forms a boundary from which the collimated beam is totally internally reflected when the switch is in one state. The electro-optic material is embedded in the substrate and the boundary may be formed between the electro-optic material and a portion of the substrate. Alternatively, the boundary is formed between the electro-optic material and another substantially optically transmissive material formed on the substrate, both of which are imbedded in the substrate. In one embodiment, the electro-optic material and the another substantially optically transmissive material are surrounded by electrically insulating material. The substrate may comprise silicon and the electrically insulating material may comprise silicon dioxide. In one embodiment, the boundary is formed between the electro-optic material and an open region.

In another aspect of the invention, an apparatus comprises an array of spaced-apart TIR switches and a collimator which receives light from an optical fiber and transmits a collimated beam through the array. The space between the switches is less than the Rayleigh range of the collimator. Preferably, the Rayleigh range is between about 100 micrometers ($\mu$m) and 5 centimeters (cm), and more preferably between about 100 micrometers (mm) and 5 millimeters (mm). In one embodiment, the collimator has a diameter between about 125 $\mu$m and 500 $\mu$m. The apparatus may additionally comprise a coupling element which receives the collimated beam and couples it to an optical fiber as an output beam.

In yet another aspect of the invention, a method comprises providing a switch array comprised of TIR switches and transmitting an unguided collimated beam through a plurality of the switches in the switch array. Preferably, the substantially unguided collimated beam diverges such that the diameter of the beam increase by no more than a factor of about $\sqrt{2}$ after being transmitted through the switches.

In still another aspect of the invention, a method of manufacturing an array of TIR switches comprises providing a slab comprised of a first optically transmissive material. A first plurality of substantially parallel channels is formed in the slab and the first plurality of channels is filled with a second optically transmissive material. At least one of the transmissive materials is electro-optically active, one of the transmissive materials is either electro-optically inactive or substantially less electro-optically active than the other. A second plurality of substantially parallel channels is also formed in the slab. The second plurality of channels at an angle relative to the first plurality. In addition, a third plurality of substantially parallel channels is formed in the slab. This third plurality of channels is at an angle relative to second plurality.

The first optically transmissive material may comprise electro-optic material and the second optically transmissive material may comprises non-electro-optic material. In another embodiment, the first optically transmissive material comprises non-electro-optic material and the second optically transmissive material comprises electro-optic material. The method may include depositing a substantially optically transmissive material on the array of TIR switches, and this material may be selected from the group consisting essentially of silicon dioxide, glass, sapphire, rutile, brookite and quartz.

In one embodiment, a fourth and a fifth plurality of substantially parallel channels are formed in the slab. The fourth and fifth pluralities of channels are also formed at an angle relative to second plurality. The channels may be formed in the slab by sawing.

The method may further comprise depositing conductive material to form electrodes on and under at least one electro-optic material.

In yet another aspect of the invention, a method of manufacturing an array of TIR switches includes providing a slab comprised of a optically transmissive electro-optically active material and forming a first plurality of substantially parallel channels in the slab. A second plurality of substantially parallel channels are also formed in the slab, the second plurality of substantially parallel channels being formed at an angle relative to the first plurality. A third plurality of substantially parallel channels are also formed in the slab at an angle relative to second plurality.

DETAILED DESCRIPTION OF THE PREFERRED EMBODIMENT

Figure 1A:
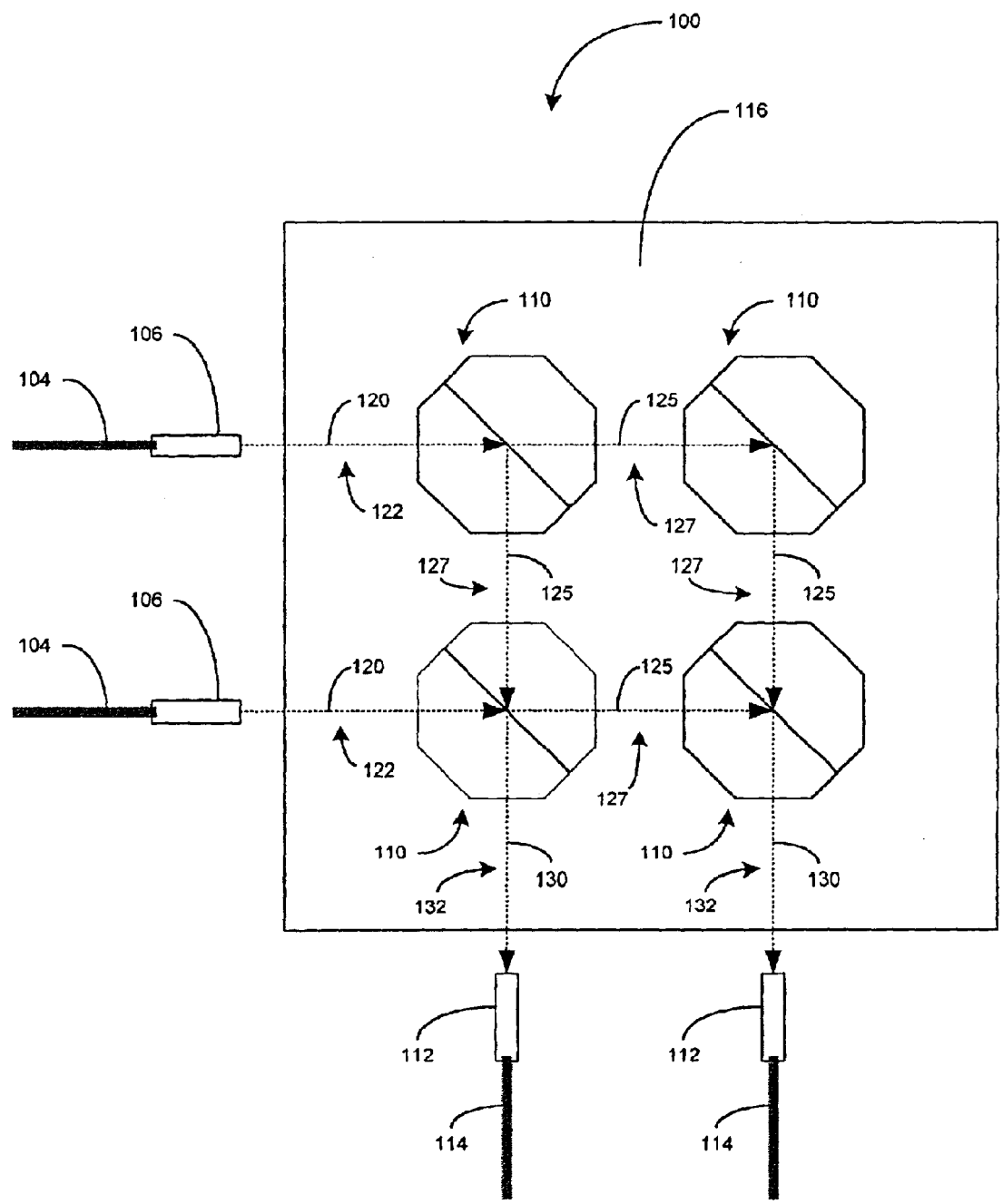
FIG. 1A schematically illustrates a 2×2 array of total internal reflection (TIR) switches that provides for free space propagation of light signals from an array of inputs to an array of outputs.

Reference will now be made to the drawings wherein like numerals refer to like parts throughout. FIG. 1A schematically illustrates one embodiment of a free space switch array 100. A 2×2 array is illustrated for the purpose of this description, but it will be understood that the free space switch array 100 can be expanded to an N×N array, where N is an integer. The free space switch array 100 comprises a plurality of total internal reflection (TIR) switches 110 arranged in an optical layer 116 in a two dimensionally periodic manner.

A plurality of input waveguides 104 and a plurality of output waveguides 114, comprising, e.g., optical fiber, terminate proximate the free space switch array 100 as shown in FIG. 1A. The waveguides 104, 114 may alternatively comprise planar or buried waveguides such as for example in an integrated optical chip. Other types of waveguides adapted to guide light from one place to another as is well known in the art or yet to be devised may also be suitably employed. In one preferred embodiment, however, the waveguides 104, 114 comprise optical fibers. Each input optical fiber 104 is aligned with one row of switches while each output waveguides is aligned with one column. The locations of the input optical fibers 104 and the output optical fibers 114 are selected so as to permit selective switching of optical signals from any one of the input optical fibers 104 to one of the output optical fibers 114.

Collimators 106 are located at each distal end of the respective input optical fibers 104. As shown, these collimators 106 may be butt up against the ends of the optical fibers 104. Similarly, coupling elements 112 are located adjacent the output waveguides 114. Both the collimators 106 and the coupling elements 112 have a small body diameter between about 100 micrometers (μm) to 500 micrometers (μm) and are particularly suitable for beam sizes between about 30 μm and 300 μm. The same type of optical element may be used as both collimator 106 and the coupling element 112 as both involve the conversion between diverging or converging beams and substantially collimated beams. Although the aperture size of these collimators 106 is small in comparison to many conventional collimating lenses, these collimators have a relatively a long Rayleigh range. As use herein, the Rayleigh range of a collimator 106 is the distance over which the beam propagates while its diameter increases by a factor of $\sqrt{2}$. In one embodiment, collimators that have Rayleigh range between about 100 μm and 5 centimeters (cm) may be utilized. One example of a particularly suitable collimator 106, which has a diameter of about 100 μm and a Rayleigh range between about 2 to 4 millimeters (mm), is available from Horizon Photonics, Inc., Walnut, Calif. This collimator from Horizon Photonics can be used for the coupling element as well.

In the free space switching array 100, free space regions exist between the collimators 106, the switches 110, and the coupling elements 112. A beam of light traveling from the collimator 106 to a switch 110, from one switch to another, and to one of the coupling elements 112 will propagate in free space, not within a waveguide. Accordingly, light in this beam is in a free space mode, not in a guided mode.

Free space mode of propagation may be readily clearly understood when compared with the guided mode of propagation which corresponds to the state of light propagating within or being "piped" through a waveguide. As is well known, waveguides have boundaries from which the light therein is reflected as it propagates. A fiber guide, for example, comprises a core and a cladding that surrounds the core. In one model, light within the fiber can be represented as rays propagating within the core and reflecting from the cladding by means of total internal reflection. In this manner, light is constrained within the waveguide as it propagates. The cladding or more generally the sidewalls of the waveguide, establish boundary conditions for the light within the guide. A given waveguide will support a specific set of guided modes, characteristics of which are determined by these boundary conditions, which themselves depend on the geometry of the guide.

By contrast, light propagating in a free space mode is not so constrained. The propagation of the light is substantially unaffected by any boundaries confining the beam. Light can propagate in a free space mode in a liquid, solid, or gaseous medium. The free space mode can exist, for example in optically transmissive materials such as glass, quartz, sapphire, rutile, brookite, silicon dioxide, as well as in polymer based substantially optically transmissive materials such as polymethyl methacrylate (PMMA) and polyvinyl butyral (PVB). The boundaries of this solid, liquid or gas, however, are widely spaced in comparison to the size of the optical beam passing therethrough. The beam is therefore said to be in the free space mode and not the guided mode.

One disadvantage associated with free space propagation is that light tends to diverge as it propagates. The divergence results in the light beam's cross-sectional profile becoming larger, which poses difficulty if the beam is to be efficiently coupled into an optical component a distance from its source. In the embodiment shown in FIG. 1, this disadvantage is overcome by collimating the light beam, in which case the rays of light within the beam are made substantially parallel, within the Rayleigh range defined above. Thus, the collimators 106 employed in the free space switching array 100 preferably have a Rayleigh range, the distance that the light beam can maintain a specific level of collimation, at least as long as the longest optical path through the array from the input waveguide 104 to the respective output 114 to permit use of free space propagated light. The collimators 106 are therefore adapted to provide a collimated beam of light that remains substantially collimated even after traveling the maximum path length possible in the free space switch array 100.

The free space switching array 100 depicted in FIG. 1A is specifically designed to provide free space propagation of light through the plurality of switches 110 and employs collimators 106 having relatively long Rayleigh ranges to facilitate efficient coupling into the switches and the output optical fiber 114. As shown in FIG. 1A, the collimator 106 is spaced apart from the plurality of switches 110. A region 122 in the layer 116 in which the switches 110 are formed stands between the collimators 106 and the switches 110 closest to them. Regions 127 also separate the switches 110 and other regions 132 separate the coupling element 116 from the switches closest thereto. These regions 122, 127, 132 in the layer 116 in which the switches 110 may comprise material substantially optically transmissive to light passing through waveguides 104 and 114. As described herein, this material may comprise solid or liquid such as for example, glass, quartz, sapphire, silicon dioxide, deactivated PLZT, rutile, or a polymer based material such as PMMA or PVB. Deactivated PLZT is discussed in U.S. patent application No. 09/891,689 entitled "Deactivated Electro-Optic Material and Method of Forming the Same", filed Jun. 26, 2001, which is incorporated herein by reference in its entirety. In alternative embodiments, the optical layer 116 may be absent and the regions 122, 127, and 132 may comprise open spaces of air, vacuum, or gas. Accordingly, beams of light traveling from the input optical fibers 104 to the output optical fibers 114 propagate largely, if not entirely, in free space mode.

Figure 1B:
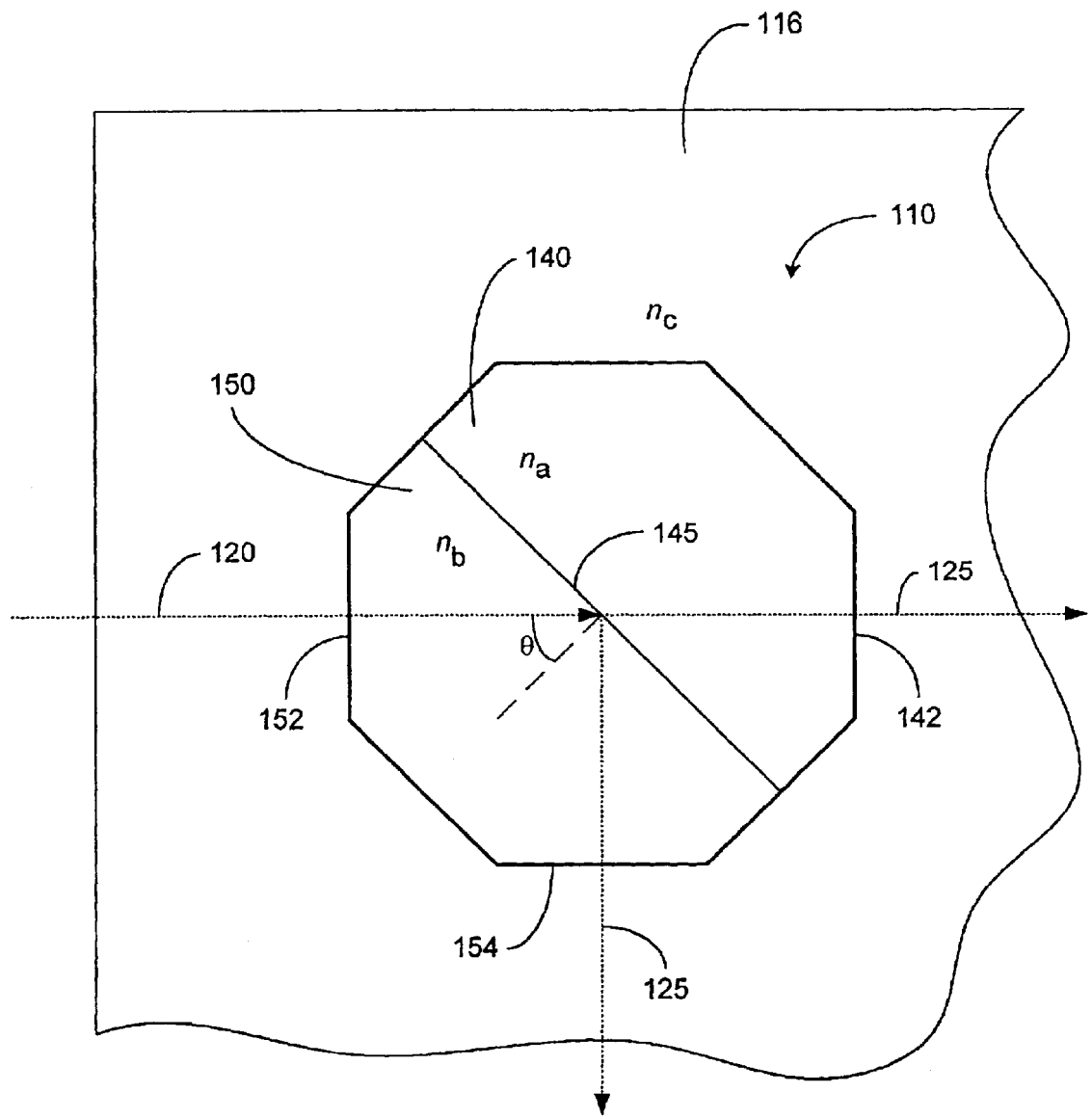
FIG. 1B is an enlarged view of one of the TIR switches of FIG. 1A.

Light passing through the free space switching array 100 also travels through portions of the switches 110. FIG. 1B illustrates, in greater detail, one of the TIR switches 110 of FIG. 1A. In the embodiment shown, the TIR switch 110 is formed in the optical layer 116 and is octagonal shaped. The octagon is divided in half diagonally so as to define region a 140 and region b 150, with an optical boundary 145 therebetween. In one embodiment, region a 140 comprises an electro-optic material such that its refractive index can be altered by application of an electric field, and region b 150 comprises an optically transmissive material. Preferably, region a 140 comprises an electro-optic material, polycrystalline lanthanum-modified lead titanate zirconate (PLZT), and region b 150 comprises a non-electro-optic material such as a deactivated PLZT. Some of these devices are described in more detail in copending U.S. patent application No. 10/140,083 (TOPTICS.004CP4) entitled "Optical Switching Network and Network Node and Method of Optical Switching", filed by Romanovsky on May 6, 2002, U.S. patent application No. 10/013,336, entitled "Electro-Optic Switching Assembly and Method" filed on Nov. 5, 2001, and U.S. patent application No. 09/434,085, entitled "Total Internal Reflection Light Modulating Microstructure Devices", filed on Nov. 5, 1999, now U.S. Pat. No. 6,381, 060, issued to Romanovsky on Apr. 30, 2002, which are incorporated herein by reference in their entirety.

In one version of the device 110, region a 140 has a refractive index of $n_a$ and region b 150 has a refractive index of $n_b$ such that $n_b$ is close to $n_a$ in magnitude when the electric field is off in region a 140. When the electric field is turned on in region a 140, the refractive index $n_a$ is lowered (at least for certain polarization states, e.g., light polarized parallel to the applied electric field) such that $n_b > n_a$. The gradient in the refractive index, when sufficient, induces total internal reflection, i.e., TIR. Preferably, the optical layer 116 has a refractive index of $n_c$ that is close to $n_b$. Refractive indices $n_a$, $n_b$, $n_c$ being close to each other (when the electric field is off in region a) ensures that light beams are transmitted substantially fully through various boundaries in the free space switch array 100 without significant Fresnel reflections.

If the electric field is turned on in region a 140 of this specific device, the refractive index $n_a$ decreases (at least for certain polarization states, e.g., light polarized parallel to the applied electric field) such that $n_a < n_b$. As is well known, when light passes from a first medium with a refractive index that is higher than that of a second medium into which it is incident, total internal reflection occurs if the incident angle θ is greater than the critical angle given by:

$$\theta_c = \sin^{-1}(n_2/n_1) \quad (1)$$

where $n_1$ is the refractive index of the incident side and $n_2$ is the refractive index of the transmitted side. In this case, $n_1 = n_b$ and $n_2 = n_a$. Thus, when the electric field strength is increased in region a 140 such that $n_a$, becomes small enough so as to make $\theta_c$ smaller than θ, the light beam 120 is reflected internally at the boundary 145. In this manner, switching can be effectuated by total internal reflection. Although one switch design has been described with reference to FIG. 1B, the free space switching array 110 is not so limited; rather other types of TIR switches 110 can be employed. For example, the indexes need not be watched when the electric field is not applied. Also, the optical switch 110 may comprise electro-optic material that increases in refractive index with electric field (in region 150). Many other variations in design of the TIR switch 110 that is incorporated in the free space switching array 110, such as those described in copending U.S. patent application No. 10/140,083 filed by Romanovsky on May 6, 2002 and entitled "Optical Switching Network and Network Node and Method of Optical Switching," are considered possible.

During operation of this array 100, light is propagated through the input optical fibers 104 toward the switches 110. The collimator 106 reduces the divergence of the light exiting the optical fiber 104, which would otherwise emerge at an angle determined by the numerical aperture of optical fiber. With the collimator 106 in place, however, the light beam exiting the input optical fiber 104 is substantially collimated within the Rayleigh range. The collimated input light beam 120 traverses the free space region between the collimator 106 and the respective optic switch 110. This free space region corresponds to the space between the collimator 106 and the edge of the free space array 100 as well as region 122. Traveling in free space, the light is unguided, i.e., it is not confined by the sidewalls of a waveguide.

The collimated unguided input light beam 120 enters the TIR switch 110, which can be in a first state wherein the input light beam 120 is transmitted substantially straight through, or in a second state wherein the input light beam 120 is reflected within the TIR switch 110 by total internal reflection. The TIR switch 110 can provide for two possible paths thereby enabling the switching function employed in the free space switching array 100. FIG. 1A illustrates intermediate light beams 125 for all possible paths within the free space switch array 100. By selectively setting the state(s) of the TIR switch(es) 110, a specific pathway between any of the input optical fiber 104 to any one of the output optical fibers 114 can be formed. Thus, one or more of the input light beams 120 can be directed towards the appropriate output optical fiber(s) 114 as desired.

The switching function of the array 100 can be achieved by a plurality of switches connected together by waveguides, in which case the input light beams are delivered to the TIR switches 110 in guided mode and the collimators 106 are removed. Light in the intermediate beams 125 between the TIR switches 110 would also be in guided mode, as would be the output light beams 130 that leave the TIR switches 110, in the case where waveguides connect the output switches to the output waveguides 114. The extensive use of the waveguides in the TIR switch array 100, however, would complicate fabrication due to complexity and high cost of wafer planar processing equipment.

The free space switch array 100, however, does not require waveguides. Light travels in free space, not in waveguides, from the input optical guides 104 to the switches 110, from one switch to another 110, and to the output optical fibers 114. The efficient coupling of light from the input guides 104 into the optical switches 110 and ultimately into the output optical fibers 114 is facilitated by the collimator 106 which provides a substantially collimated beam over a sufficiently long distance, e.g., from the input optical guide 104 to the output optical guide 114. Preferably, for an N×M array of switches, with N switches in a row and M switches in a column, the Rayleigh range of the collimator is at least about as long as the distance along a row through the N switches or down a column through the M switches. More preferably, the Rayleigh range of the collimator is at least about as long as the optical path through a row of the N switches and down a column of the M switches. Preferably, the diameter of the collimated beam does not diverge by a factor greater than about √2 as the beam propagates through these N switches in a row or M switches in a column. More preferably, the diameter of the collimated beam does not diverge by a factor greater than about √2 as the beam propagates through an optical path traversing N switches in a row and M switches in a column. By minimizing divergence of the beam, substantially all the light can be directed into the switches 110, the coupling element 112, and into the output optical fiber 114.

Preferably, the TIR switch 110 also comprises a free space device, that is, the switch itself encompasses a large enough region that light passing therethrough is not guided; the light within the switch is not characterized as a guided mode but as a free space mode. The dimensions of the TIR switch 110 are preferably sufficiently large in comparison to the size of the beam to support free space modes and not guided modes. Preferably, the beam size is between about 30 μm and 400 μm, and more preferably between about 30 μm and 100 μm in diameter. The collimators 106 and the coupling elements 112, for example, are preferably between about 100 μm to 500 μm in diameter. The TIR switches 110 preferably have a cross-section perpendicular to the propagation path of the beam, with dimensions between about 50 μm×50 μm and 400 μm×400 μm, and inter-switch spacing between about 300 μm and 3000 μm. Accordingly, substantially all the diverging beam passes through the TIR switch 110 without being reflected from its sidewalls back into the switch; the beam is thus preferably not confined by the TIR switch 110.

Figure 2:
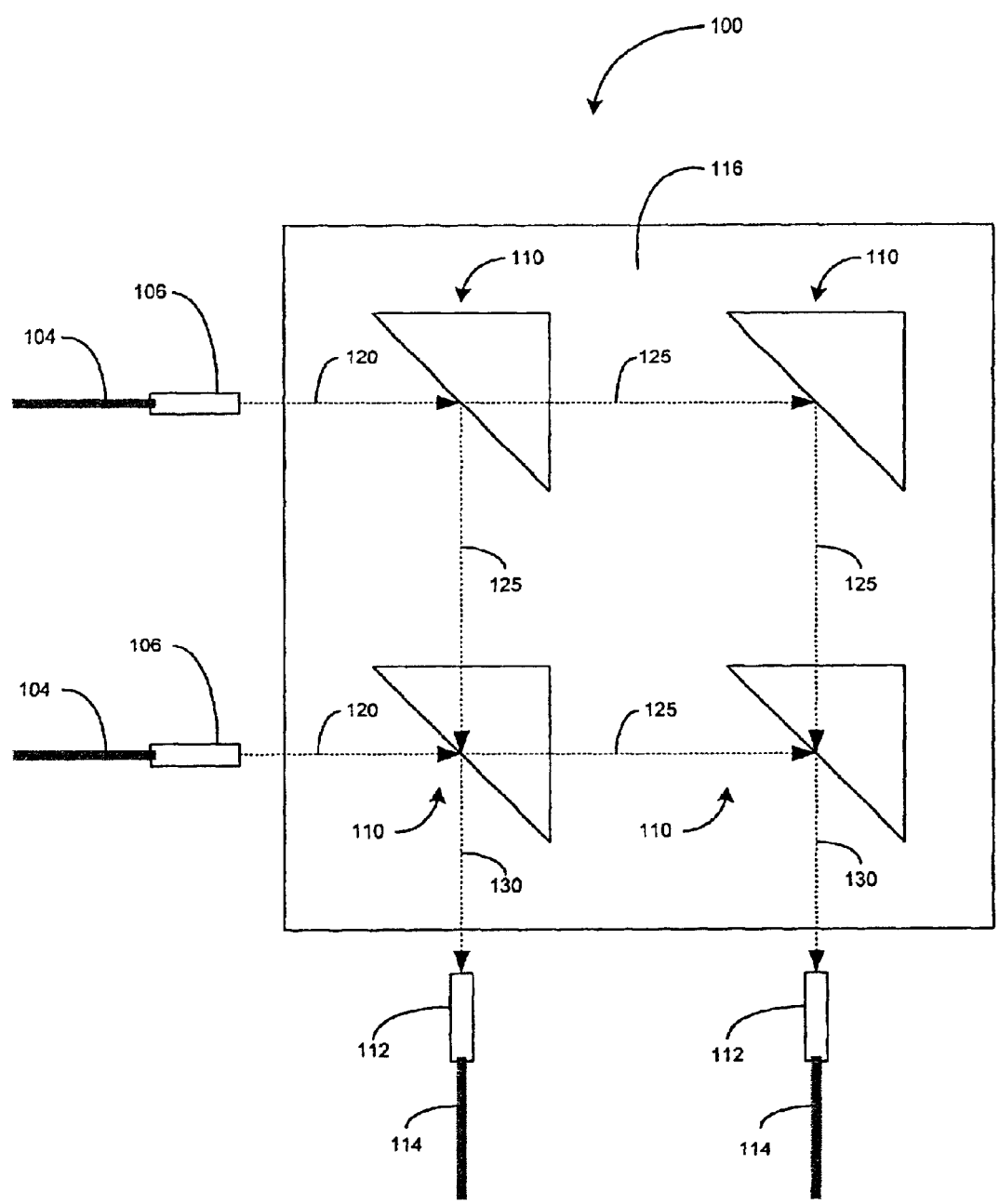
FIG. 2 schematically illustrates another embodiment of the TIR switch array that requires a reduced number of steps to fabricate.

FIG. 2 illustrates another embodiment of the free space switch array 100, wherein the TIR switch 110 comprises a region of electro-optic material formed in a triangular shape. The TIR switches 110 are imbedded within the optical layer 116 such that the array 100 comprises two optically transmissive materials, the two being the electro-optic material of the TIR switch 110 and the optical layer 116 itself. In this embodiment, the switching action occurs at the boundary between the optical layer 116 material and the electro-optic material, as shown in FIG. 2. The embodiment of FIG. 2 is particularly advantageous in allowing a high density of switches to be fabricated closely together to form a large port count switch array in which hundreds or more of the collimators 106 and 112 may be used.

Figure 3A:
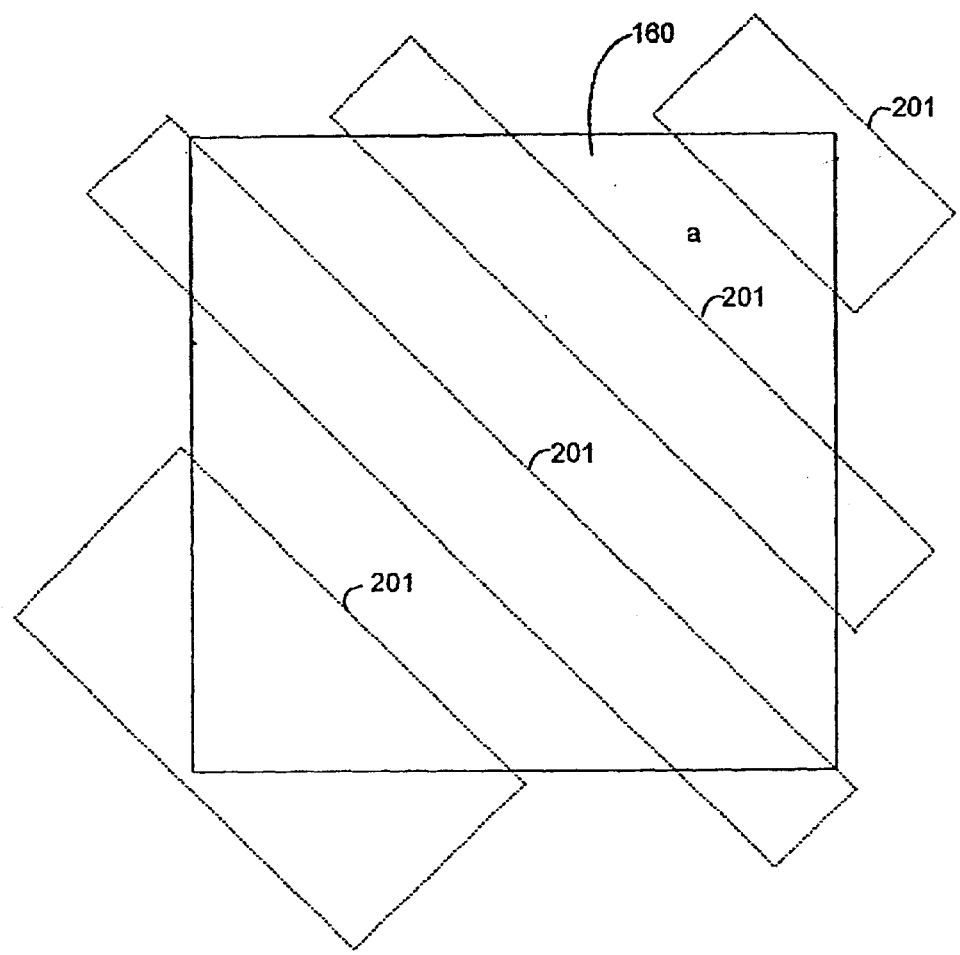
FIGS. 3A to 3F illustrate the steps employed to fabricate the TIR switch array of FIG. 2.
Figure 3B:
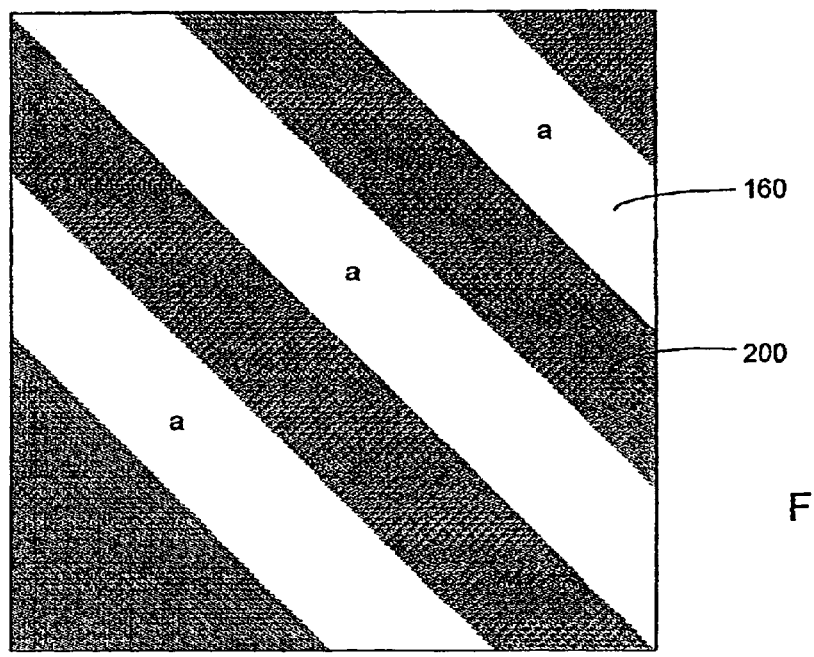
Figure 3C:
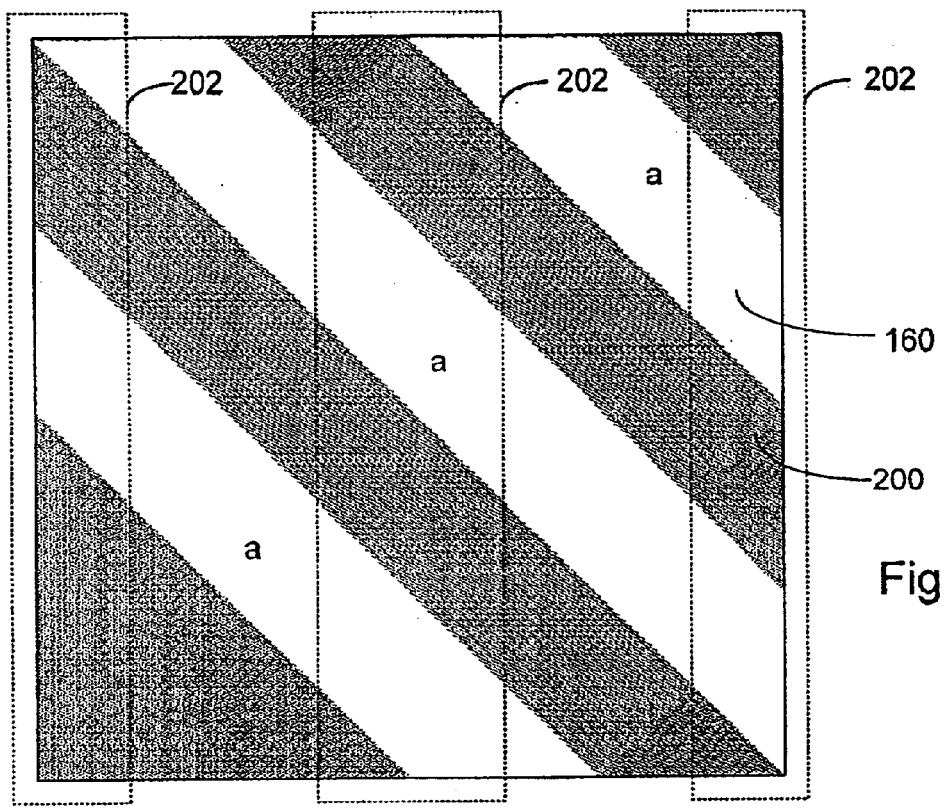
Figure 3D:
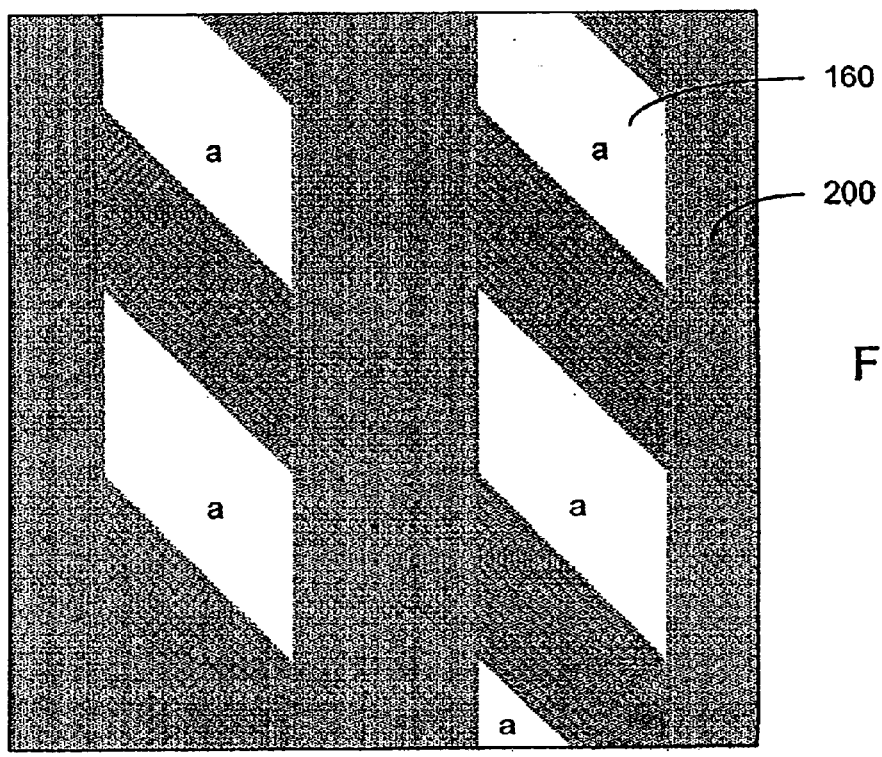
Figure 3E:
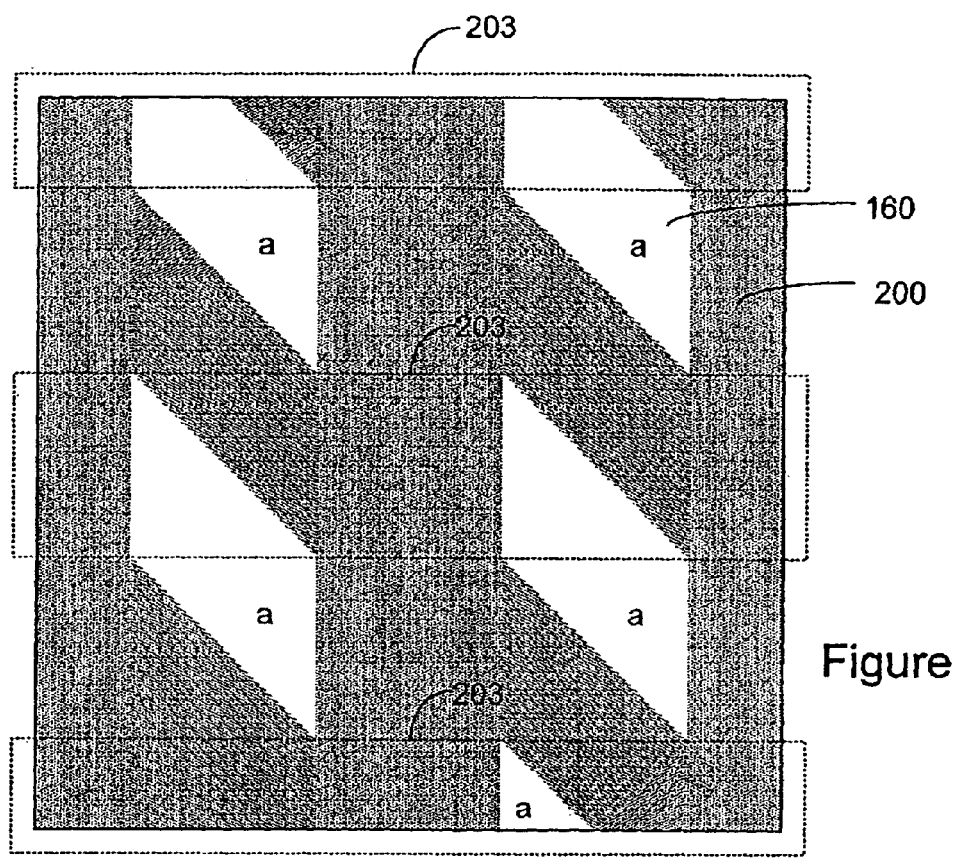
Figure 3F:
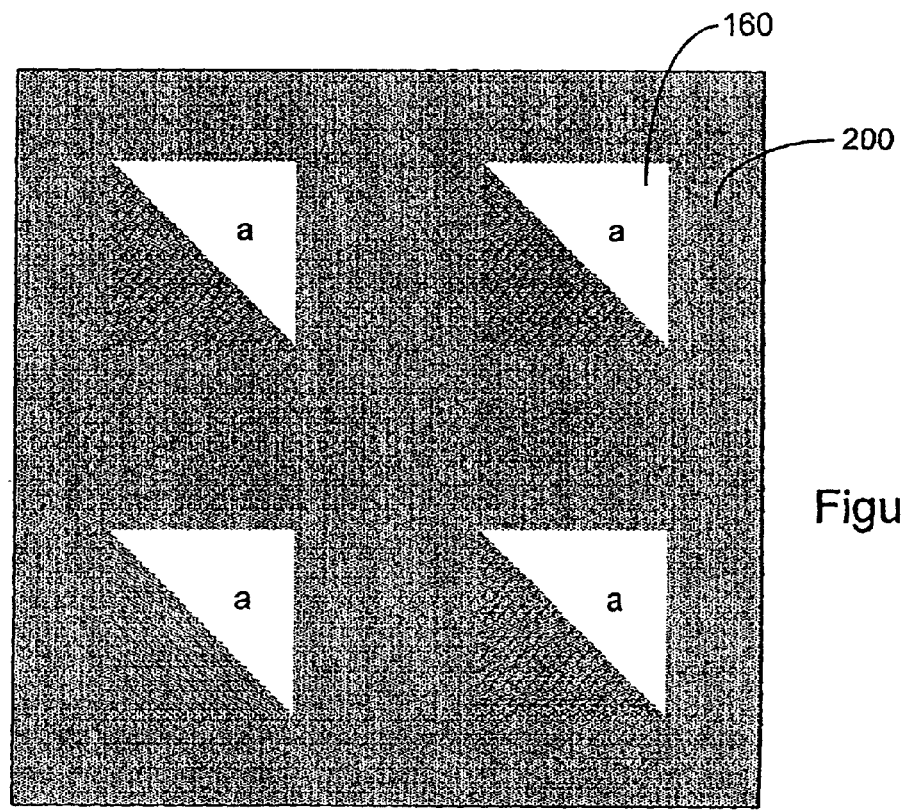

FIGS. 3A to 3F illustrate the steps employed to fabricate the array shown in FIG. 2. The process is simplified because waveguides are not used to connect the switches 110. FIGS. 3A, 3C, 3E illustrate three sets of parallel cuts, and FIGS. 3B, 3D, 3F illustrate the results of the cuts, respectively. Preferably, grooves are cut using a precise computer controlled semiconductor dicing machine using a "cut and polish" saw blade that simultaneously cuts and polishes side walls of the grooves. Alternatively, the grooves can be cut using laser ablation.

FIG. 3A illustrates a first set of cuts 201 in a layer of material a 160 that has been formed on the underlying base (not shown). Preferably, material a is PLZT. The first set of cuts 201 are substantially parallel; the switching boundaries of the switch array 100 are defined by these cuts. FIG. 3B illustrates the result of the cuts of FIG. 3A, wherein resultant cut regions 200 are shown as diagonal shaded regions. FIG. 3C illustrates a second set of cuts 202 to define vertical edges of the TIR switches 110. The results of the first and the second cuts 201, 202 are shown as shaded cut regions 200 in FIG. 3D. FIG. 3E illustrates a third set of cuts 203 intended to define horizontal edges on the TIR switches 110. FIG. 3F illustrates the result of the three cuts, wherein the cut regions 200 corresponds to a void surrounding the triangular PLZT structures. An optically transmissive material, such as deactivated PLZT, glass, silicon dioxide, polymers etc., is deposited on the cut region 200 to form the optical layer 116 of FIG. 2.

FIGS. 4A through 4F illustrate an alternative method of fabricating the free space switch array 100 depicted in FIGS. 1A and 1B, wherein the TIR switch 110 is octagonally shaped. The array 100 in this embodiment comprises three different optically transmissive materials, resulting in additional fabrication steps. As in the fabrication described above with reference to FIGS. 3A to 3F, the procedure begins with a layer of material a 160, preferably an electro-optical material such as PLZT, on top of the underlying base (not shown). Groove are formed for example, by with saws, as described above.

Figure 4A:
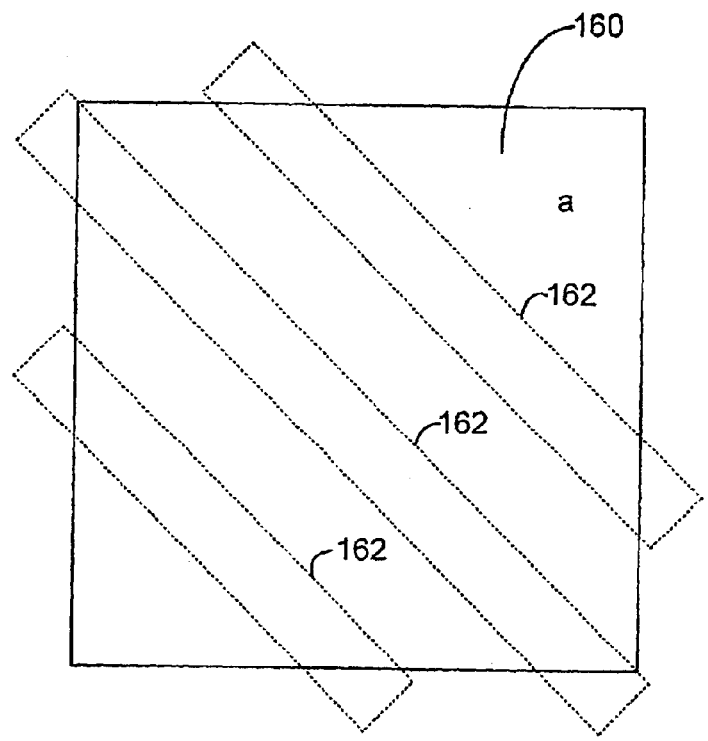
FIGS. 4A to 4F illustrate a method of fabricating the TIR switch array of FIG. 1A.
Figure 4B:
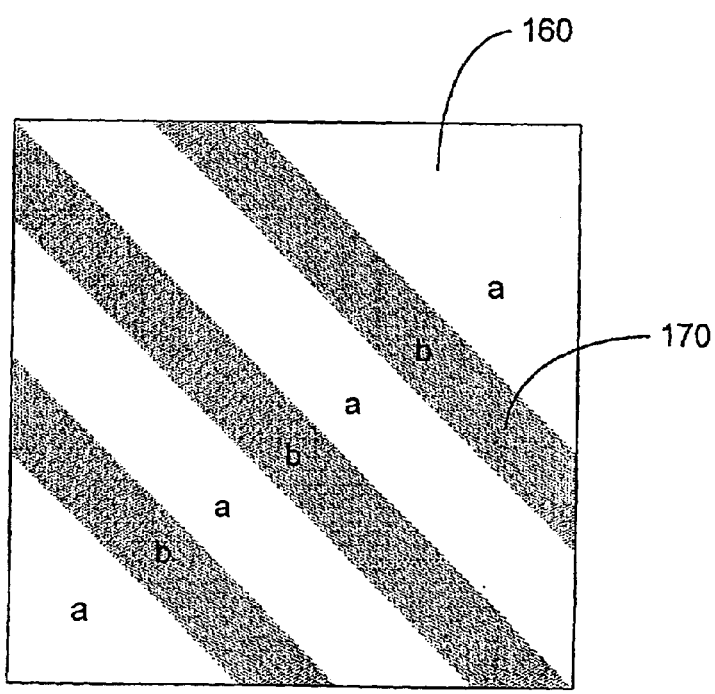

FIG. 4A illustrates a first set of cuts 162 that run diagonally across the layer of material a 160. The grooves cut out by the first set of cuts 162 are filled with material b 170, another optically transmissive material, preferably deactivated PLZT. Preferably, material b is deposited using a sol-gel process. FIG. 4B illustrates the alternating pattern of material a 160 and material b 170.

Figure 4C:
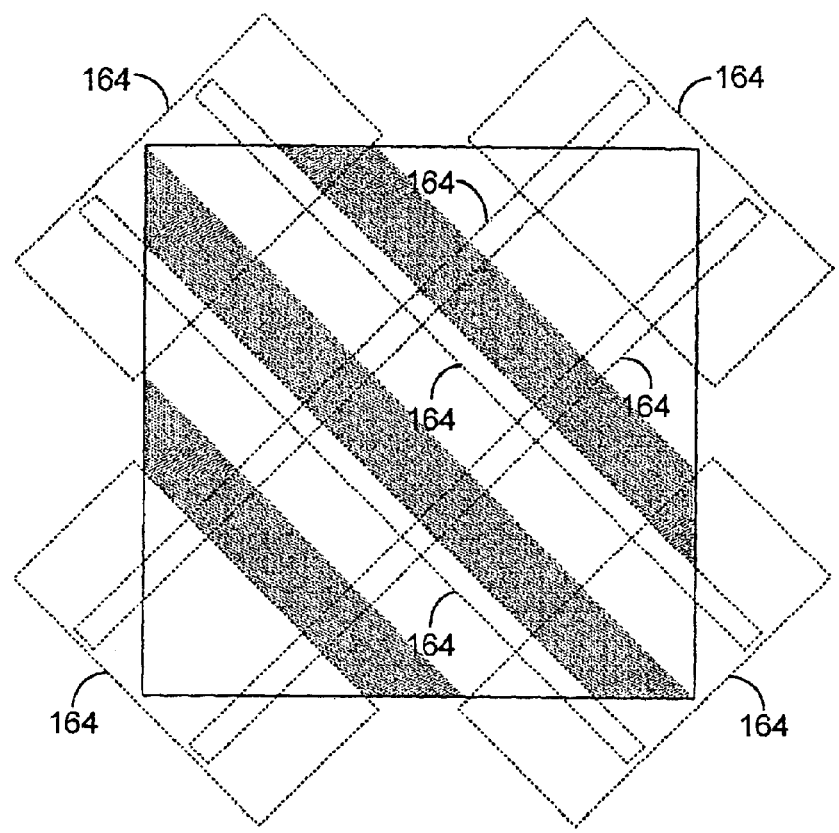
Figure 4D:
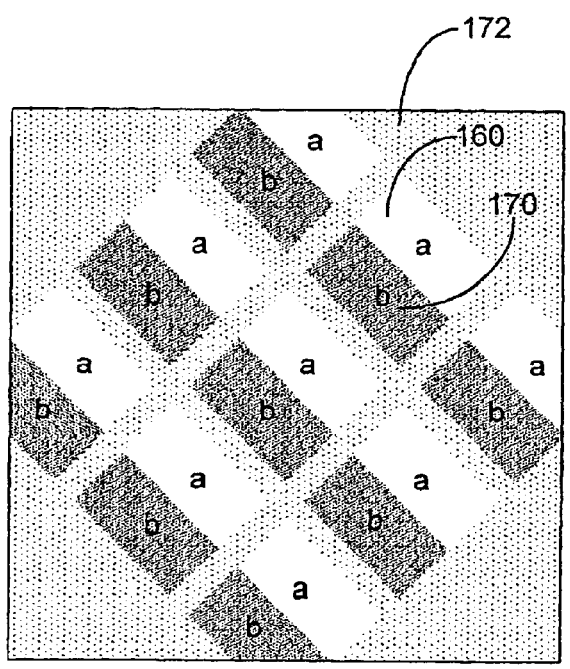

A second and third set of cuts 164, illustrated in FIG. 4C, are made to separate the individual switches 110 and to remove unneeded areas from the layer of material a 160. The result of these cuts 164 are shown in FIG. 4D, where a plurality of regions comprising material a 160 and material b 170 are formed amidst a cut region 172.

Figure 4E:
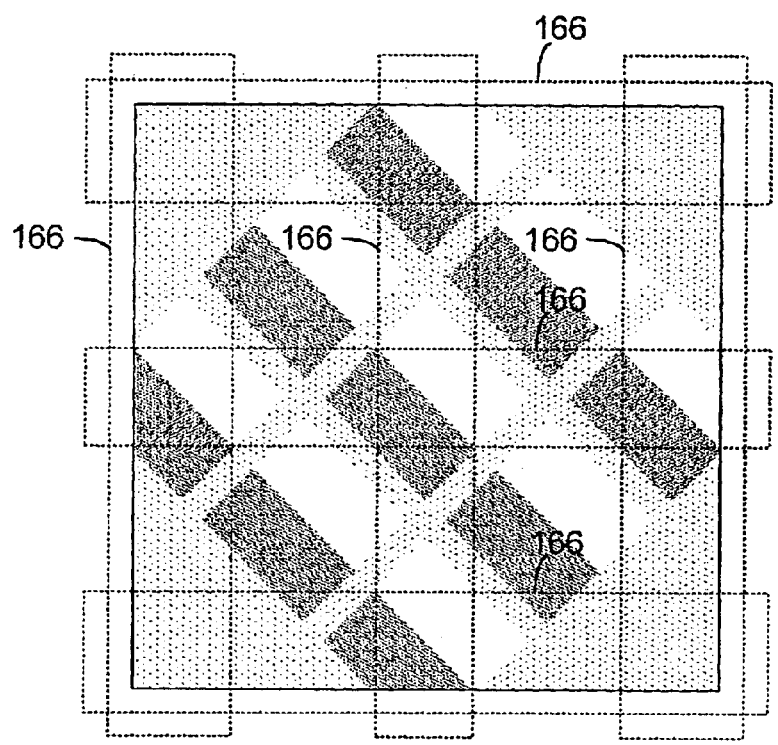
Figure 4F:
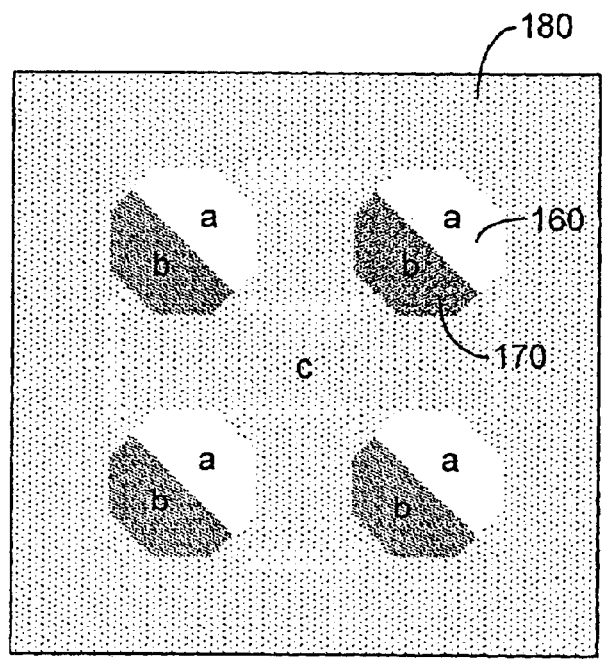

A fourth and fifth set of cuts 166, depicted in FIG. 4E, form the horizontal and vertical faces of the switches 110, where the beams will pass and also remove the unneeded materials a 160 and b 170. The result of these cuts 166 is a plurality of octagonal shaped switches 110 that protrude from a plane defined by the cut region 172. The sides of the switches 110 may be polished to improve the transmission of light, and the cut region 172 may be filled with material c 180. Preferably, material c 180 comprises an optically transmissive material with a refractive index $n_c$, preferably one that is close to the refractive indices $n_b$ and $n_a$ when unactivated. FIG. 4F illustrates the final arrangement of the array of switches, comprised of material a 160 and material b 170, within the layer of material c 180. Material c 180 is described and illustrated as the optical layer 116 in FIG. 1A.

In other embodiments, the material a need not comprise PLZT nor even electro-optic material. This material, may for example, comprise, glass, silicon dioxide, quartz, sapphire, titanium dioxide, or a polymer-based substance such as PMMA or PVB. In this embodiment, electro-optic material can be used as material b which may be deposited into the grooves after the first set of cuts.

Figure 5:
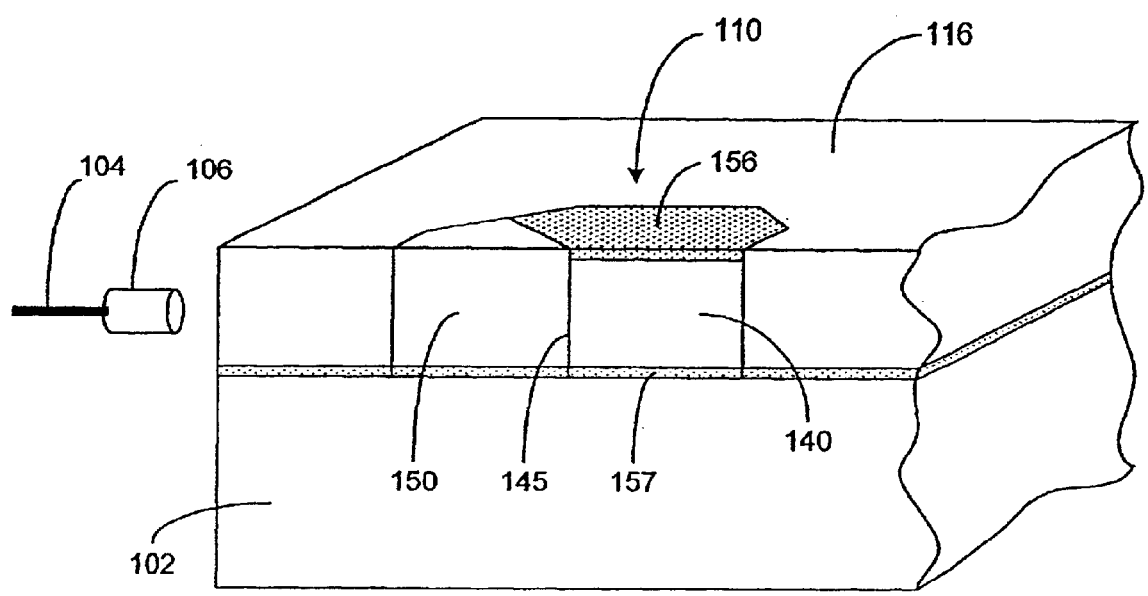
FIG. 5 is a perspective cutaway view of the TIR switch of FIG. 1B formed on a substrate.

FIG. 5 illustrates a perspective cutaway view of the free space switching array 100 of FIG. 1A showing in particular detail one of the TIR switches 110. The TIR switch 110 is situated on top of a lower electrode 157. The lower electrode 157 layer in turn is situated on top of a substrate 102. This substrate may comprise, for example, silica, glass, quartz, sapphire, polymer, or various other transparent or non-transparent materials that would provide a structure for supporting the array of switches.

Surrounding the sides of the TIR switch 110 is the optical layer 116. This optical layer comprises a substantially optically transmissive material, i.e., a material that substantially transmits light having a wavelength of that exiting the input waveguides 104. This material may comprise for example, silica, glass, quartz, sapphire, or polymeric materials, such as PMMA and PVB.

An upper electrode 156 is situated on top of region a 140 so as to be able to provide the electric field between the upper electrode 156 and the lower electrode 157 in the volume that coincides substantially with region a 140. The electrodes 156, 157 comprise conducting material, preferably metals such as chrome, gold, and aluminum. Alternatively, conductive oxides such as $RuO_2$, $Ir_2O_3$ and $La_{0.5}$—$Sr_{0.5}$—$C_{0.3}$—$O_x$ may be used for lower fatigue and longer life. In this embodiment, region b 150 is preferably substantially free of the electric field. The input waveguide 104 and the collimator 106 are positioned to allow the input light beam to impinge on the TIR switch 110 preferably at mid-height.

The basic composition of the TIR switch 110 illustrated in FIG. 5 also applies to the triangular shaped TIR switch 110 of FIG. 2. Preferably, the substrate 102 comprises silicon, quartz, glass, or some other material to provide mechanical support to the optical layer 116 and the lower electrode 157. The top and lower electrodes 156 and 157 are preferably fabricated by depositing chrome, gold, or aluminum into a layer in a manner well known in the art.

Figure 6:
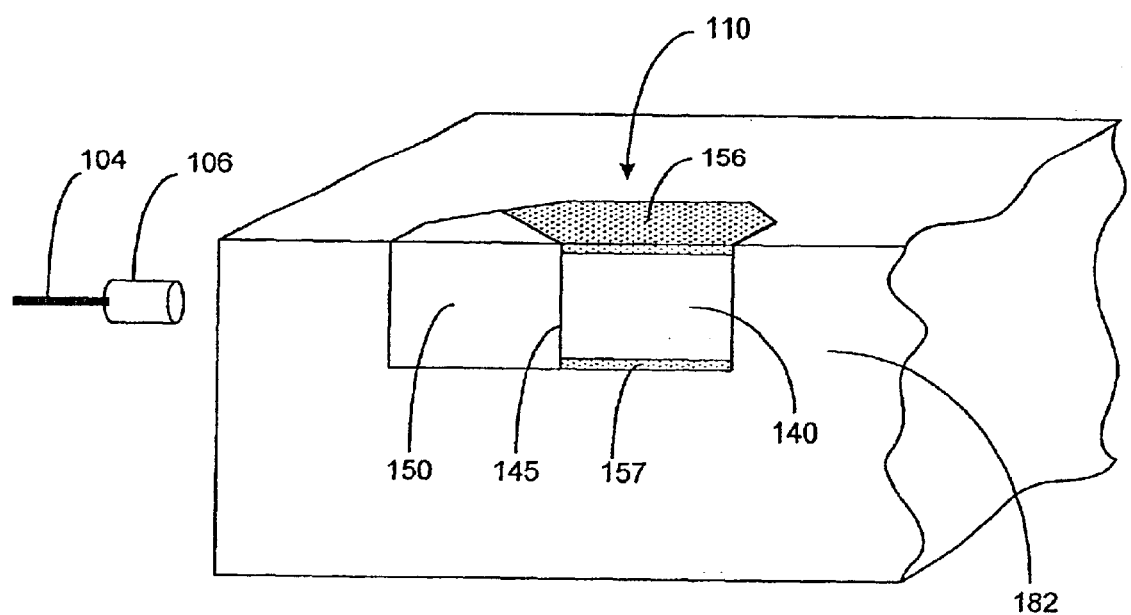
FIG. 6 is a perspective cutaway view of another embodiment of the TIR switch.

In another embodiment of the invention, the TIR switch 110 is fabricated by a series of cavity formations and material depositions. The cavities may be formed using, for example, ion milling, reactive ion etching, or laser ablation processes that are well known in the art. FIG. 6 illustrates one embodiment of the TIR switch 110 that could be fabricated by forming of cavities in a substrate. The process begins by milling out a cavity from an insulating substantially optically transmissive substrate 182, i.e., that is substantially optically transmissive to the light emitted by the input collimators 106, such as glass, sapphire, or quartz. The cavity is formed in the shape of the desired TIR switch 110. Various components of the TIR switch 110 are fabricated by a series of depositing and milling processes. In one embodiment, region a 140 comprises the electro-optic material such as the PLZT, which is interposed between the electrodes 156 and 157. Region b 150 comprises non-electro-optic material such as, for example, deactivated PLZT. In the embodiment illustrated in FIG. 6, the substrate 182 provides mechanical support for the free space switch array 100 and is also the optical layer comprising material c 180 that is referred to with regard to FIG. 4F. The substrate 182 preferably comprises sapphire or $TiO_2$ wafer such as rutile or brookite.

In one of the embodiments described above, the refractive indices of materials in the TIR switch 110 and the surrounding material are preferably substantially close to each other, with only the refractive index $n_a$ of region a 140 subject to change. Since the refractive indices $n_b$ and $n_c$ are preferably similar, region b 150 of FIG. 6, may comprise the same material that comprise the substrate 182 such that $n_b=n_c$. In such an embodiment, the cavity in the substrate 182 formed is shaped so as to allow the lower electrode 157, region a 140, and the upper electrode 156 to be deposited therein.

In yet another embodiment of the invention, an optical switch 110 such as the one depicted in FIG. 6, includes a region b 150 comprising deactivated PLZT. To fabricate such a TIR switch 110, the cavity formed initially on the substrate 182 is shaped to include both regions a 140 and b 150. The entire cavity is deposited with the deactivated PLZT, after which another cavity that will become region a 140 is formed. The lower electrode 157, region a 140, and the upper electrode 156 are deposited.

Figure 7:
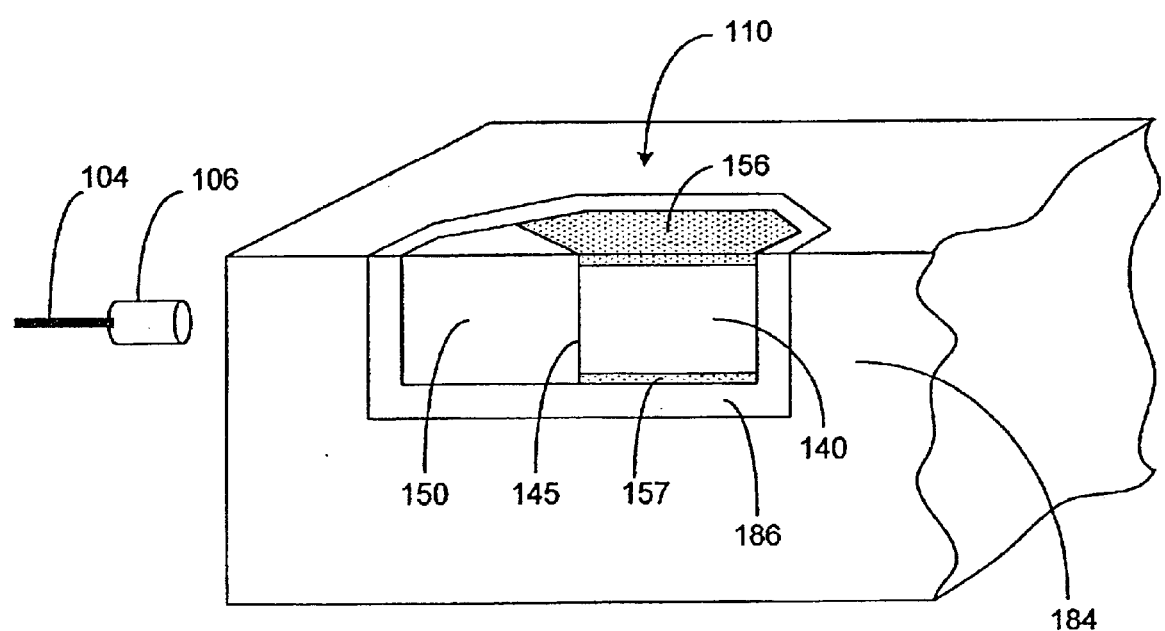
FIG. 7 is a perspective cutaway view of yet another embodiment of the TIR switch.

FIG. 7 illustrates still another embodiment of the invention wherein the switch additionally comprises an surrounding insulating layer 186. In this embodiment, the array 100 comprises a substrate 184 onto which an insulator can be formed. The substrate 184, may for example comprise silicon which is readily oxidized. The cavity 186 is formed in the silicon substrate 184 to fabricate the TIR switches 110. The insulating layer 186 is created by first forming a cavity in the substrate that will defines the outer surface of the insulating layer 186. The insulating layer 186 is formed on the substrate 184, and in particular, in the cavity. Silicon dioxide, for example, can be grown on the surface of the silicon substrate 184 and in the cavity. Silicon dioxide, $SiO_2$, is an insulating but substantially optically transmissive material. As the silicon substrate 184 is a semiconductor, the insulating layer 186 can be used to isolate the electrodes 156 and 157 from the substrate 184. Once the insulating layer 186 is formed on the silicon substrate 184, the TIR switch 110 is formed within the insulating layer 186 in a manner similar that described with reference to FIGS. 5 and 6.

Any of these TIR switches 110, as well as various other designs, including those yet devised, can be suitably employed in the free space switching array 100 to enable one or more optical signals to be routed into any of a variety of output optical fibers 114 or other waveguides. Notably, the light beam traveling from the input optical fibers 104 to the optical switches 110, between adjacent optical switches, and to the output optical fibers 114, is not guided but rather propagates in free space. Since the light emerging from the input optical fiber or waveguide 104 travels in the free space mode within the array of TIR switches 110, waveguides do not need to be fabricated within the array 100. As such, compared to devices that use waveguides to interconnect the switches, the array of TIR switches 110 can be fabricated in a manner that is substantially simpler and does not require expensive planar wafer processing equipment.

Although the foregoing description of the preferred embodiment of the invention has shown, described and pointed out the fundamental novel features of the invention, it will be understood that various omissions, substitutions and changes in the form of the detail of the apparatus as illustrated, as well as the uses thereof, may be made by those skilled in the art without departing from the spirit of the invention. Consequently, the scope of the invention should not be limited to the foregoing discussion, but should be defined by the appended claims.

What is claimed is:

1. A switch array, comprising:
   a substrate having a surface,
   a plurality of TIR switches having a respective plurality of TIR surfaces, said switches mounted such that said TIR surfaces extend substantially orthogonally to said surface of said substrate,
   at least one input collimator mounted to receive an input beam from a waveguide and transmit a substantially collimated input beam towards at least one of said TIR surfaces, and
   at least one coupling element positioned to receive said substantially collimated input beam and couple it to a waveguide as an output beam,
   wherein said collimated input beam passing between said switches has a maximum beam size, said array further comprising a free space region between adjacent switches, said free space region comprising material that is substantially optically transmissive to said collimated input beam and being substantially devoid of boundaries that limit said beam size of said collimated input beam traveling between said switches so as to provide for free space propagation of said collimated input beam.

2. The switch array of claim 1, wherein said free space region is dimensioned to substantially exceed said beam size.

3. The switch array of claim 2, wherein said collimated input beam has a maximum beam diameter between about 30 micrometers ($\mu$m) and 300 micrometers ($\mu$m).

4. The switch array of claim 3, wherein said free space region is dimensioned to exceed said input beam diameter.

5. The switch array of claim 2, wherein said free space region comprises an open region.

6. The switch array of claim 2, wherein said free space region comprises solid material.

7. The switch array of claim 6, wherein said substantially optically transmissive material in said free space region is selected from the group consisting of glass, quartz, silicon dioxide, sapphire, brookite and rutile.

8. The switch array of claim 7, wherein said substrate comprises a material selected from the group consisting of glass, quartz, silicon, sapphire, brookite and rutile.

9. The switch array of claim 6, wherein said switches are imbedded in said substrate such that said free space region comprises said substrate material.

10. The switch array of claim 1, further comprising a free space region between said input collimator and at least one of said TIR switches, said free space region substantially devoid of boundaries that limit said beam size of said collimated input beam traveling from to said TIER switches so as to provide for free space propagation of said collimated input beam.

11. The switch array of claim 10, wherein said free space region between said collimator and said TIR switches is dimensioned to substantially exceed said beam size of said collimated input beam.

12. The switch array of claim 11, wherein said free space region between said collimator and said TIER switches are dimensioned to exceed said input beam diameter.

13. The switch array of claim 1, further comprising a free space region between at least one of said switches and at least one of said optical coupling elements, said free space region substantially devoid of boundaries that limit said collimated input beam traveling between said switch and said optical coupling element so as to provide for free space propagation of said collimated input beam.

14. The switch array of claim 13, wherein said collimated input beam passing through said free space region between said switch and said optical coupling element has a maximum beam size and said free space region is dimensioned to substantially exceed said beam size.

15. A switch array, comprising:
a substrate having a surface,
a plurality of TIR switches having a respective plurality of TIR surfaces, said switches mounted such that said TIR surfaces extend substantially orthogonally to said surface of said substrate,
at least one input collimator mounted to receive an input beam from a waveguide and transmit a substantially collimated input beam towards at least one of said TIR surfaces, and
at least one coupling element positioned to receive said substantially collimated input beam and couple it to a waveguide as an output beam,
wherein said TIR switches include a portion comprising electro-optic material and disposed between two electrodes, said portion forming a boundary from which said collimated beam is totally internally reflected when said switch is in one state.

16. The switch array of claim 15, wherein said electro-optic material is imbedded in said substrate and said boundary is formed between said electro-optic material and a portion of said substrate.

17. The switch array of claim 15, wherein said boundary is formed between said electro-optic material and another substantially optically transmissive material formed on said substrate.

18. The switch array of claim 17, wherein said electro-optic material and said another substantially optically transmissive material are imbedded in said substrate.

19. The switch array of claim 17, wherein said electro-optic material and said another substantially optically transmissive material are surrounded by electrically insulating material.

20. The switch array of claim 19, wherein said substrate comprises silicon and said electrically insulating material comprises silicon dioxide.

21. The switch array of claim 15, wherein said boundary is formed between said electro-optic material and an open region.

22. A switch array, comprising:
a substrate having a surface,
a plurality of TIR switches having a respective plurality of TIR surfaces, said switches mounted such that said TIR surfaces extend substantially orthogonally to said surface of said substrate,
at least one input collimator mounted to receive an input beam from a waveguide and transmit a substantially collimated input beam towards at least one of said TIR surfaces, and
at least one coupling element positioned to receive said substantially collimated input beam and couple it to a waveguide as an output beam,
wherein said substantially collimated beam diverges such that the diameter of said beam increases by no more than a factor of about $\sqrt{2}$ over a path through said switches.

23. A switch array, comprising:
a substrate having a surface,
a plurality of TIR switches having a respective plurality of TIR surfaces, said switches mounted such that said TIR surfaces extend substantially orthogonally to said surface of said substrate,
at least one input collimator mounted to receive an input beam from a waveguide and transmit a substantially collimated input beam towards at least one of said TIR surfaces, and
at least one coupling element positioned to receive said substantially collimated input beam and couple it to a waveguide as an output beam,
wherein said substantially collimated beam diverges such that the diameter of said beam increases by no more than a factor of about $\sqrt{2}$ over a distance at least as long as the longest optical path through said TIR switches.

24. An apparatus comprising:
an array of spaced-apart TIR switches, and
a collimator which receives light from an optical fiber and transmits a collimated beam through the array, wherein the space between said switches is less than the Rayleigh range of the collimator.

25. The apparatus of claim 24, wherein said Rayleigh range is between about 100 micrometers ($\mu$m) and 5 centimeters (cm).

26. The apparatus of claim 25, wherein said Rayleigh range is between about 100 micrometers ($\mu$m) and 5 millimeters (mm).

27. The apparatus of claim 24, wherein said collimator has a diameter between about 125 micrometers ($\mu$m) and 500 micrometers ($\mu$m).

28. The apparatus of claim 24, further comprising a coupling element which receives said collimated beam and couples it to a waveguide as an output beam.

29. The apparatus of claim 28, wherein said substantially unguided collimated beam diverges such that the diameter of said beam increases by no more than a factor of about $\sqrt{2}$ over a path from said collimator through said TIR switches to said coupling element.

30. A method of manufacturing an array of TIR switches, comprising:
providing a slab comprised of a first optically transmissive material,
forming a first plurality of substantially parallel channels in the slab,
filling the first plurality of channels with a second optically transmissive material, at least one of said transmissive materials being electro-optically active, one of the transmissive materials being either electro-optically inactive or substantially less electro-optically active than the other;
forming a second plurality of substantially parallel channels in the slab, said second plurality of channels at an angle relative to said first plurality, and
forming a third plurality of substantially parallel channels in the slab, said third plurality of channels at an angle relative to second plurality.

31. The method of claim 30, wherein said first optically transmissive material comprises electro-optic material and said second optically transmissive material comprises non-electro-optic material.

32. The method of claim 30, wherein said first optically transmissive material comprises non-electro-optic material and said second optically transmissive material comprises electro-optic material.

33. The method of claim 30, further comprising depositing a substantially optically transmissive material on said array of TIR switches.

34. The method of claim 33, said substantially optically transmissive material is selected from the group consisting essentially of silicon dioxide, glass, sapphire, rutile, brookite, and quartz.

35. The method of claim 30, further comprising forming a fourth and a fifth plurality of substantially parallel channels in the slab, said fourth and fifth pluralities of channels formed at an angle relative to second plurality.

36. The method of claim 30, wherein said channels are formed in said slab by sawing.

37. The method of claim 30, further comprising depositing conductive material to form electrodes on and under at least one said electro-optic material.

38. A method of manufacturing an array of TIR switches, comprising:

providing a slab comprised of a an optically transmissive electro-optically active material, forming a first plurality of substantially parallel channels in the slab, forming a second plurality of substantially parallel channels in the slab, said second plurality of channels at an angle relative to said first plurality, and forming a third plurality of substantially parallel channels in the slab, said third plurality of channels at an angle relative to second plurality.

* * * * *

UNITED STATES PATENT AND TRADEMARK OFFICE
CERTIFICATE OF CORRECTION

PATENT NO. : 6,768,572 B2
DATED : July 27, 2004
INVENTOR(S) : Alexander Romanovsky It is certified that error appears in the above-identified patent and that said Letters Patent is hereby corrected as shown below:

Column 12,
Lines 58 and 66, delete "TIER" and insert -- TIR --.

Column 16,
Line 3, after "of", delete "a".

Signed and Sealed this

Seventh Day of February, 2006

JON W. DUDAS
*Director of the United States Patent and Trademark Office*